(12) United States Patent  (10) Patent No.: US 8,717,601 B2
Yabe et al.  (45) Date of Patent: May 6, 2014

(54) SERVER APPARATUS, AND TERMINAL APPARATUS

(75) Inventors: Kenta Yabe, Kawasaki (JP); Takeshi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 13/081,086

(22) Filed: Apr. 6, 2011

(65) Prior Publication Data

US 2011/0261401 A1  Oct. 27, 2011

(30) Foreign Application Priority Data

Apr. 26, 2010  (JP) ................................. 2010-101440

(51) Int. Cl.
*G06F 3/12*  (2006.01)
*G06K 15/00*  (2006.01)
*G06K 15/10*  (2006.01)
*G06F 17/00*  (2006.01)

(52) U.S. Cl.
USPC ........... 358/1.15; 358/1.16; 358/1.8; 715/239

(58) Field of Classification Search
USPC ................. 358/1.15; 707/1; 715/239
See application file for complete search history.

(56) References Cited

U.S. PATENT DOCUMENTS

| 7,259,882 | B2 | 8/2007 | Tsuda et al. |
| 2003/0007175 | A1* | 1/2003 | Tsuda et al. ................. 358/1.15 |
| 2003/0046268 | A1* | 3/2003 | Hirabayashi ..................... 707/1 |
| 2006/0055969 | A1* | 3/2006 | Miura .......................... 358/1.15 |
| 2007/0291286 | A1* | 12/2007 | Utsunomiya et al. .......... 358/1.8 |
| 2009/0249194 | A1* | 10/2009 | Day .............................. 715/239 |

FOREIGN PATENT DOCUMENTS

JP  2003-22165 A  1/2003

OTHER PUBLICATIONS

U.S. Appl. No. 13/061,903, filed Mar. 2, 2011.
Chinese Office Action dated May 3, 2013, in counterpart Chinese Application No. 201110104020. (with English translation).

* cited by examiner

*Primary Examiner* — Miya J Cato
*Assistant Examiner* — Temitayo Folayan
(74) *Attorney, Agent, or Firm* — Fitzpatrick, Cella, Harper & Scinto

(57) ABSTRACT

For a web application which takes time to execute processing, Internet connection between a web browser and the web application needs to be maintained until the completion of processing. In a web application server which provides conversion processing from document data into print data, the conversion processing itself is provided as a software process asynchronous with the web application. The web application only accepts a conversion processing execution request. The progress is confirmed using Comet communication, and the web server delays a response to an HTTP request.

6 Claims, 16 Drawing Sheets

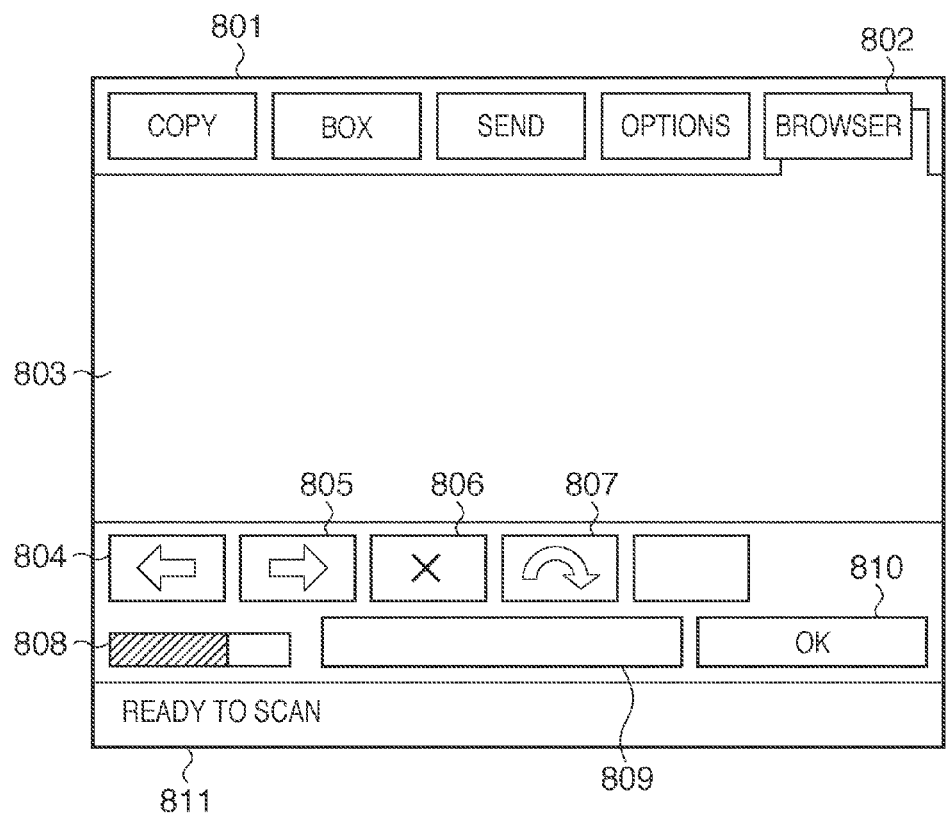

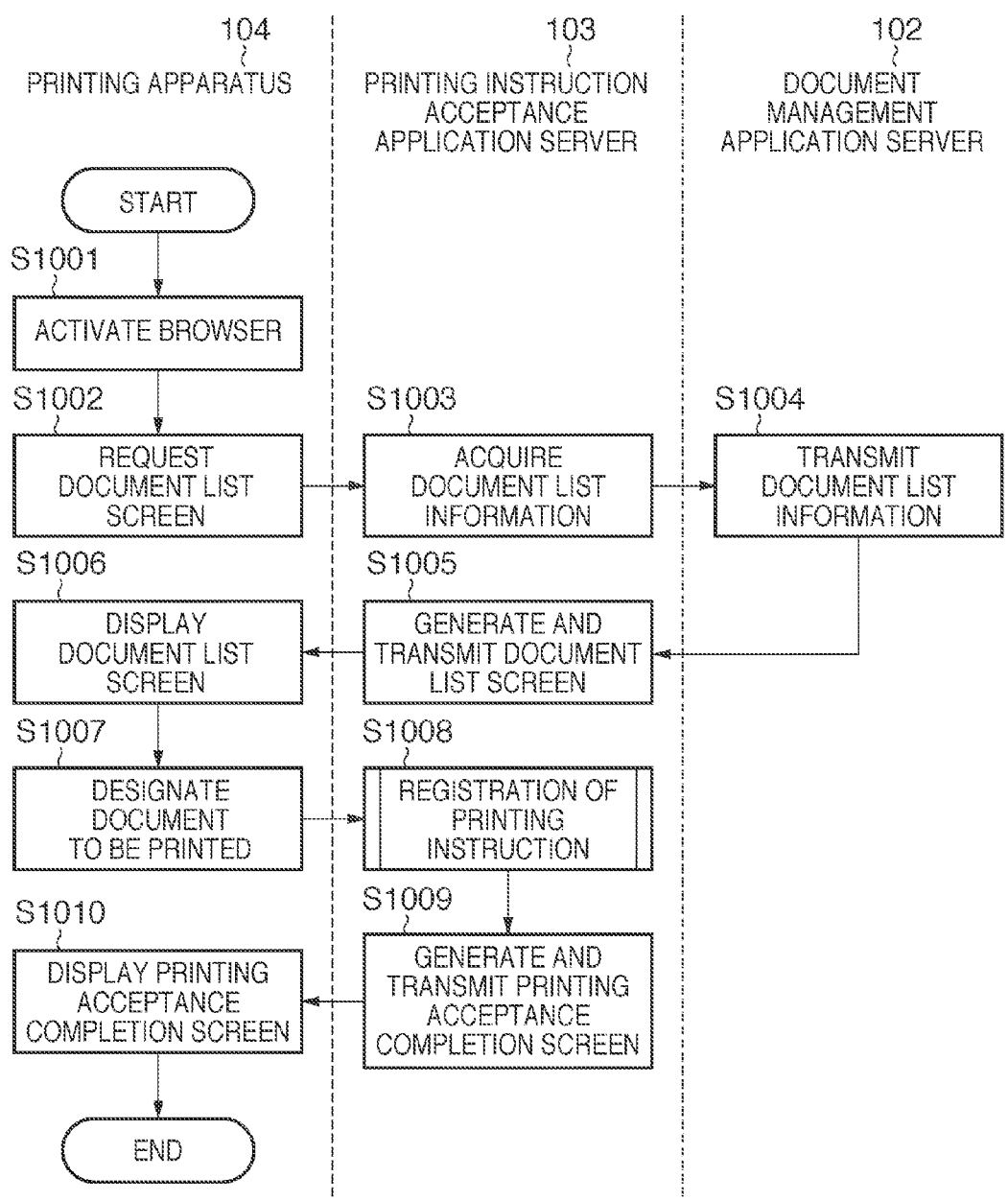

FIG. 13

PRINTING INSTRUCTION INFORMATION MANAGEMENT DATABASE

1301
PRINTING INSTRUCTION INFORMATION MANAGEMENT TABLE

| PRINTING INSTRUCTION ID 13011 | DOCUMENT ID 13012 | PRINT DATA MANAGEMENT TABLE REFERENCE ID 13013 |
|---|---|---|
| 1 | 1 | 1 |

1302
PRINT DATA MANAGEMENT TABLE

| MANAGEMENT ID 13021 | DEVICE ID 13022 | PROGRESS 13023 | PRINT DATA 13024 |
|---|---|---|---|
| 1 | Device 001 | WAIT FOR PROCESSING/ DURING PROCESSING/ COMPLETED/ ERROR | BINARY DATA |

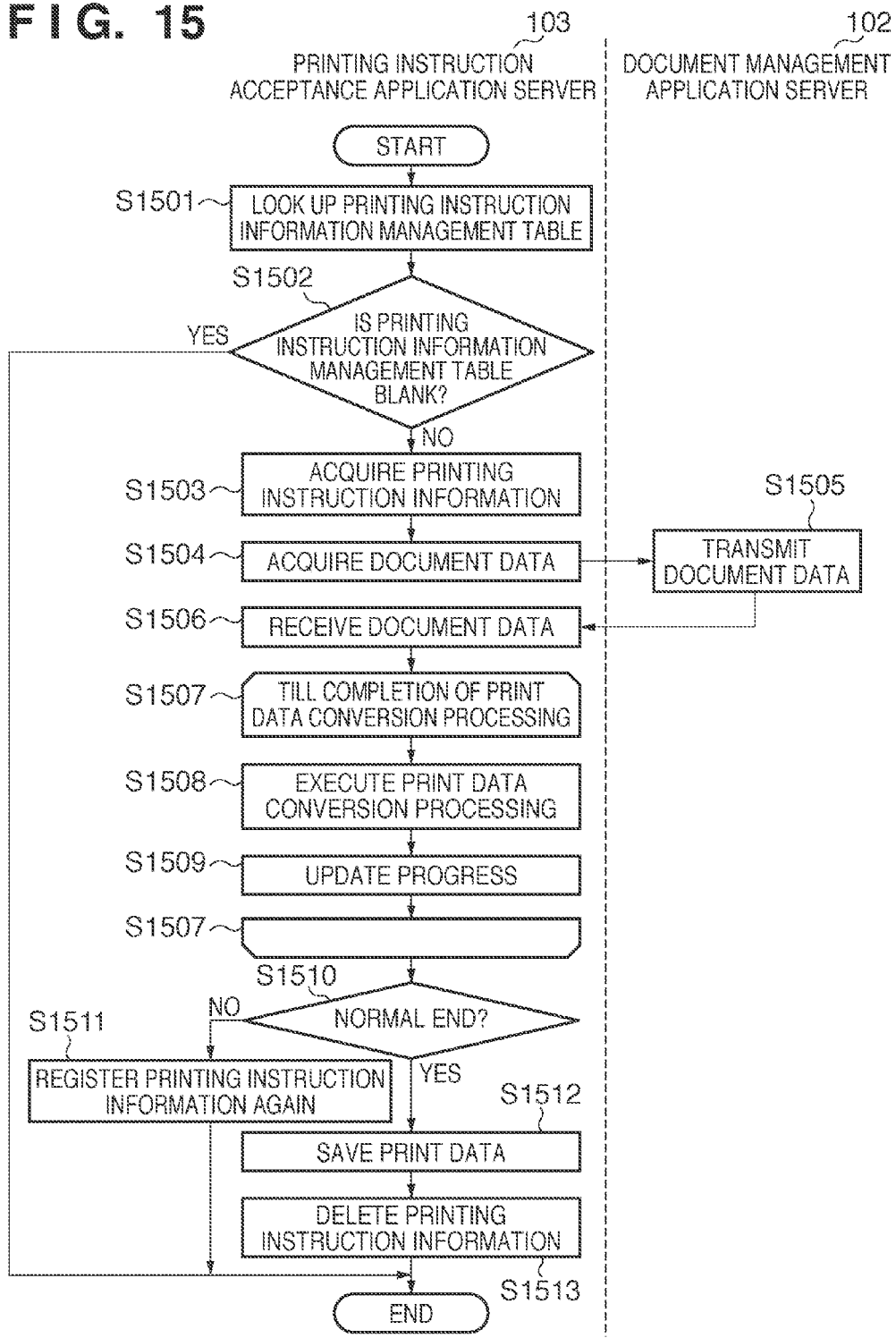

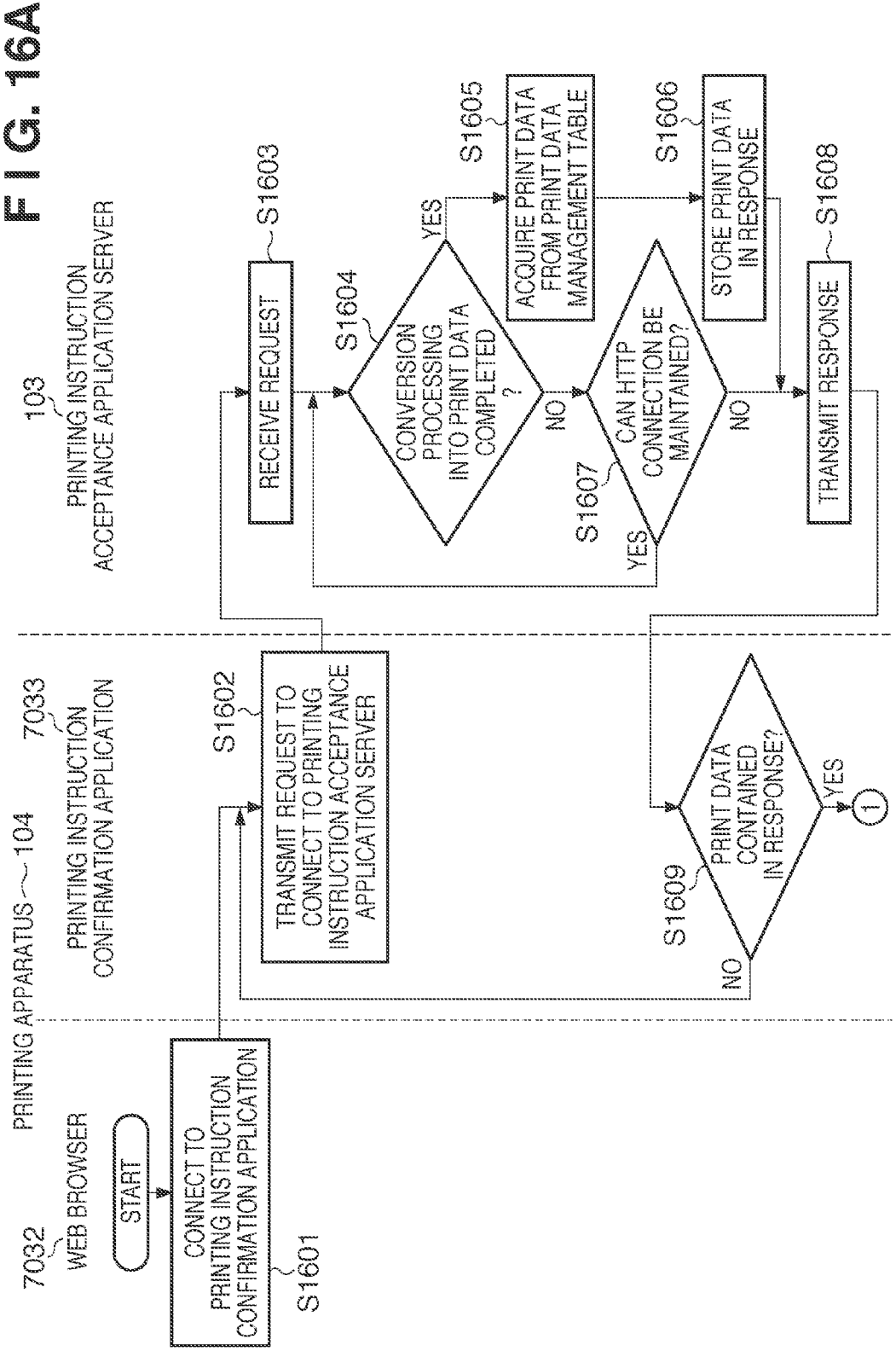

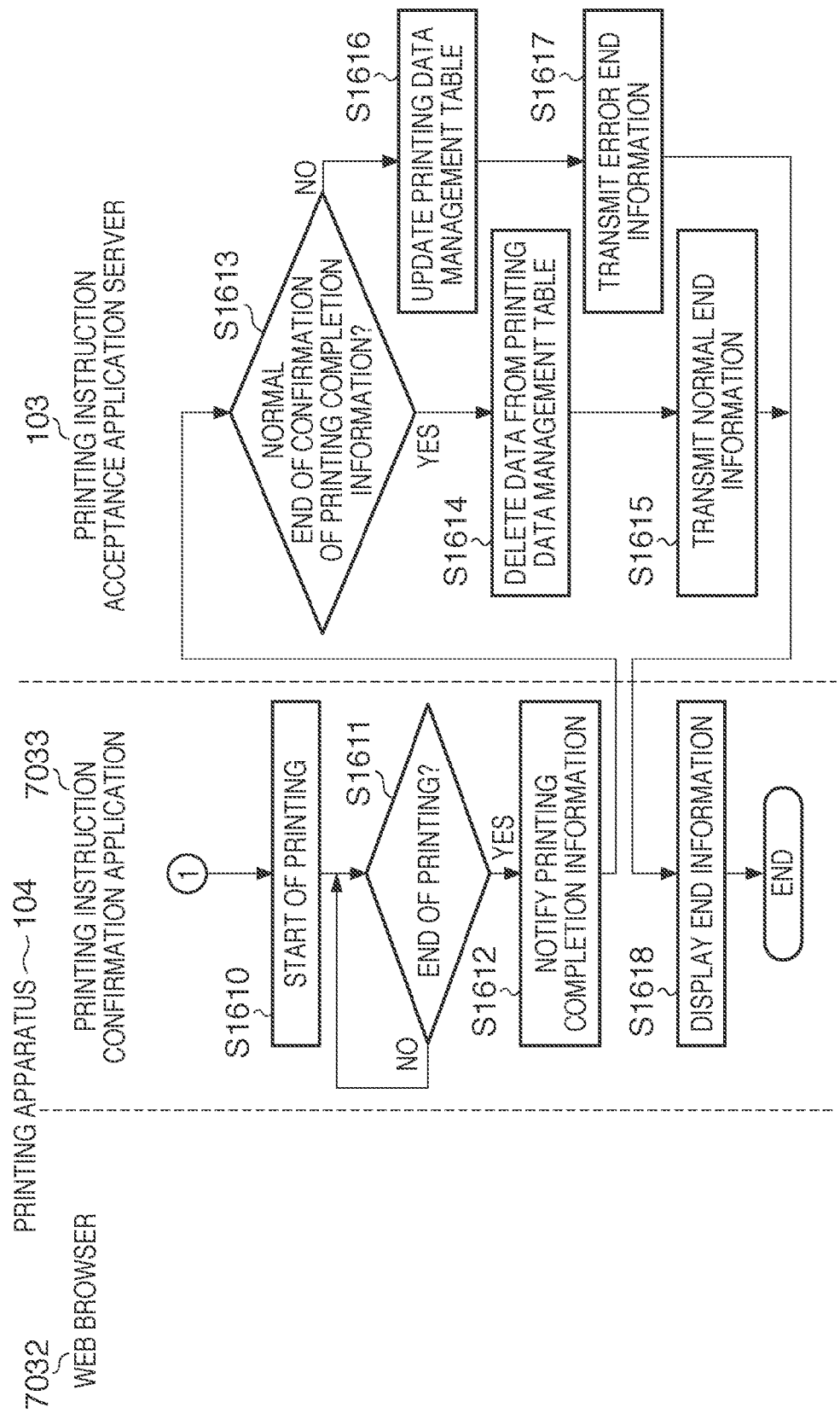

SERVER APPARATUS, AND TERMINAL APPARATUS

BACKGROUND OF THE INVENTION

1. Field of the Invention

The present invention relates to a server apparatus, and terminal apparatus for creating and printing print data in a cloud computing environment.

2. Description of the Related Art

Applications (to be referred to as web applications) which, through a web browser installed in a client terminal, use a function provided by a web application server via a network have widely prevailed.

Recently, cloud computing services are also becoming popular. The cloud computing services provide, through a network, not only a web application but also the hardware environment of a web application server for operating the web application. Typical examples of the cloud computing services are Amazon Web Service provided by Amazon-.com®, U.S.A. and Windows Azure® provided by Microsoft, U.S.A. Along with the proliferation of cloud computing services, even processing which has been conventionally implemented by installing a specific application in a client terminal is provided as a web application in the future. Even such processing is expected to become executable using only a web browser.

In this technical background, a method of providing, as a web application, a printer driver which converts document data created by an application into a data format (to be referred to as print data) interpretable and executable by a printing apparatus has been examined. By providing a driver application as a web application and cooperating with an existing document management web application, a printing apparatus having a web browser can directly perform browsing, selection, editing, and printing of a document centrally.

However, conversion processing from document data into print data, which is executed by the driver application, is expected to take a long time till the completion of execution upon accepting a request. In this processing, a time-out may occur in the web browser before the web application server sends back an HTTP response to the web browser after the completion of processing when the web application server accepts a print data conversion processing request by an HTTP request. When the web server is different from an application server which provides actual services, the time of processing by the application server may exceed the standby time of the web server, generating a time-out. The time-out is transferred as a response to the web browser.

An example of a conventional technique for preventing a time-out is a so-called polling method. According to this method, the web browser inquires the execution status of processing of the web application server in a predetermined time period during execution of the processing (see, for example, Japanese Patent Laid-Open No. 2003-022165). In polling, the web browser repeats transmission of an HTTP request and reception of an HTTP response in a predetermined period during execution of processing in the web application server. This prevents generation of a time-out, and pseudo-connection between the client and the web application server is maintained till the completion of processing.

SUMMARY OF THE INVENTION

The present invention comprises the following arrangement. That is, a terminal apparatus connected to a server apparatus which, when a response setting time has elapsed before completion of designated processing, transmits, according to Comet communication procedures, a blank response to a request for progress information of the designated processing to a terminal apparatus that has designated the processing, and when the processing is completed, transmits a completion response to the terminal apparatus, the terminal apparatus comprises: a browser, configured to transmit a conversion request to the server apparatus to convert designated document data into print data printable by a printing apparatus, and receive a reception response corresponding to the conversion request from the server apparatus; and a progress confirmation unit, configured to transmit a progress information request to the server apparatus to inquire progress of conversion processing executed in the server apparatus in accordance with the conversion request for specific document data, and receive a response to the progress information request from the server apparatus, wherein upon receiving the reception response from the server apparatus, the browser instructs the progress confirmation unit to inquire the progress of the conversion processing for the document data designated by the conversion request as the specific document data, and when the progress confirmation unit receives a blank response from the server apparatus according to the Comet communication procedures, the progress confirmation unit transmits the progress information request to the server apparatus.

According to another aspect, the present invention comprises the following arrangement. That is, a server apparatus which communicates with a terminal apparatus, the server apparatus comprises: a unit, configured to, upon receiving a conversion request from the terminal apparatus to convert designated document data into print data printable by a printing apparatus, transmit a reception response to the terminal apparatus to indicate that the conversion request has been received; a conversion unit, configured to, upon receiving the conversion request, execute conversion processing to convert the document data into the print data in accordance with the conversion request; and a unit, configured to, upon receiving a progress information request from the terminal apparatus to inquire progress of conversion processing corresponding to the conversion request, when the conversion processing is completed, transmit converted print data as a response to the terminal apparatus according to Comet communication procedures, and when a response setting time has elapsed before completion of the conversion processing, transmit a blank response to the terminal apparatus.

In the present invention, during processing in a web application server, a software process different from a web browser monitors the completion of the processing. Further, the software process performs connection to the web application server using Comet communication.

Accordingly, when executing a cloud computing service in a printing apparatus, it can be avoided to occupy the printing apparatus and web browser by a user who uses the web application server. The burden on the server during execution of the web application can also be reduced.

Further features of the present invention will become apparent from the following description of exemplary embodiments with reference to the attached drawings.

BRIEF DESCRIPTION OF THE DRAWINGS

FIG. 8 is a view for explaining the screen arrangement of a web browser 7032 displayed on an operation unit 1042 of the printing apparatus 104;

FIG. 9 is a table for explaining a document management table 901 in the document management application server 102;

FIG. 10 is a flowchart for explaining processing until document data to be printed is selected in the first embodiment;

FIG. 13 is a table for explaining a printing instruction information management database in the printing instruction acceptance application server 103;

FIG. 15 is a flowchart for explaining processing until document data is converted into print data in the first embodiment;

FIGS. 16A and 16B are flowcharts for explaining processing until the printing apparatus 104 prints print data in the first embodiment.

DESCRIPTION OF THE EMBODIMENTS

A preferred embodiment of the present invention will be described below with reference to the accompanying drawings.

In a conventional technique, when the web browser is to maintain connection by polling the web application server which is executing processing, it repeats an access to a specific URL until the completion of the processing. Hence, the web browser needs to keep displaying a specific page till the completion of the processing. When different servers provide a driver application and document management application, the web browser cannot execute a function provided by another web application server until polling ends upon completion of the processing.

Also, when the web browser is to maintain connection by polling the web application server, it cannot end till the completion of processing. A user who uses a web application occupies the printing apparatus and web browser till the completion of processing.

The present invention has been made in consideration of the conventional situation, and provides a print data creation server, printing apparatus, and printing system capable of releasing the web browser during the processing standby time of a web application even when the user requests printing from the web browser using a printer driver or document processing application provided as a web application.

[First Embodiment]
<System Configuration>

Figure 1:
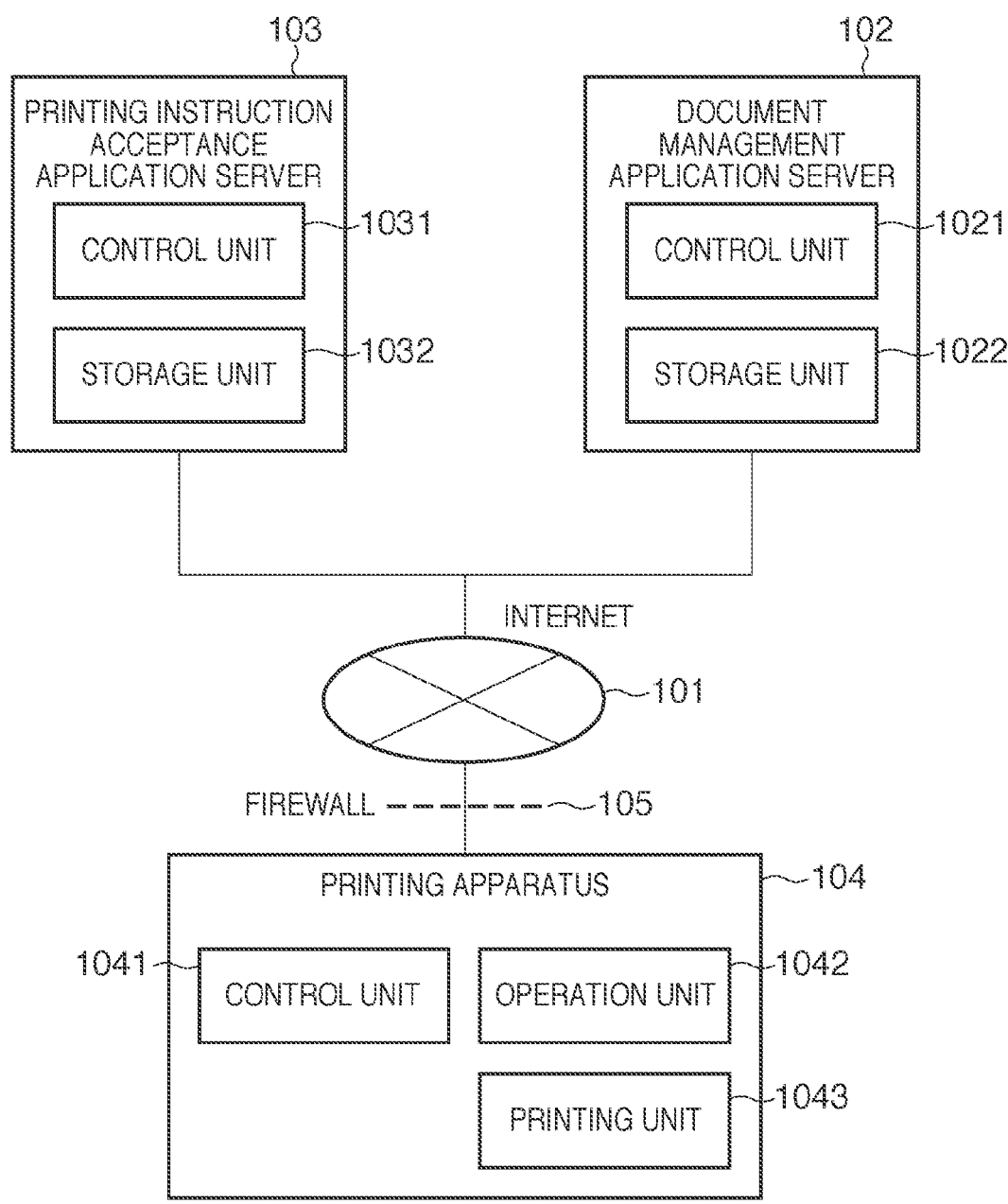
FIG. 1 is a block diagram showing a system configuration.

FIG. 1 shows the overall configuration of a system according to the first embodiment of the present invention. The system includes Internet 101, a document management application server 102, a printing instruction acceptance application server 103, a printing apparatus 104, and a firewall 105. The document management application server 102 will also be simply referred to as a document management server.

The Internet 101 functions as a communication line (communication network) for exchanging information between the above-mentioned apparatuses. The form of the line is arbitrarily wired or wireless. The document management application server 102 includes a control unit 1021 and storage unit 1022. The storage unit 1022 saves document data. Examples of the document data are a PDF file created by software such as Adobe Acrobat®, and a DOC file created by software such as Microsoft Word. The control unit 1021 plays a general known role as an application server. For example, a web application is installed in the storage unit 1022, and software processes run to provide services to the printing apparatus 104. In addition, the control unit 1021 can perform at least some of the processes of flowcharts disclosed in the embodiment and a subsequent description.

The printing instruction acceptance application server 103 includes a control unit 1031 and storage unit 1032. The storage unit 1032 saves a processing request from a web browser 4032 (to be described later), and print data serving as the execution result of a processing request. For example, the print data is data in a data format such as PDL interpretable and printable by the printing apparatus 104. The control unit 1031 plays a general known role as an application server. For example, a web application for executing each processing is installed in accordance with a processing request from the web browser 4032, and software processes run to provide each processing to the printing apparatus 104. Further, the control unit 1031 can perform at least some of the processes of flowcharts disclosed in the embodiment and a subsequent description.

The printing apparatus 104 includes a control unit 1041, operation unit 1042, and printing unit 1043. The printing apparatus 104 is a multi-function peripheral (MFP) which inputs/outputs and transmits/receives an image and executes various image processes. The control unit 1041 controls the operation unit 1042 and printing unit 1043 serving as building components of the printing apparatus 104. The operation unit 1042 includes a user interface and accepts an operation instruction for the printing apparatus 104 from the user. The printing unit 1043 is controlled by the control unit 1041, and performs various image processes and image output. The control unit 1041 includes a processor and memory, and can execute a web browser as an application program. The web browser can display data obtained as an HTTP response and execute an embedded script.

The firewall 105 operates as an apparatus which restricts access from outside via the Internet 101 for high security of the printing apparatus 104. The form of the firewall 105 is arbitrarily hardware or software. Access restriction is implemented by exchanging messages between the server and the client via the firewall 105.

<Flow of Requests and Responses Based on HTTP Protocol>

Figure 2:
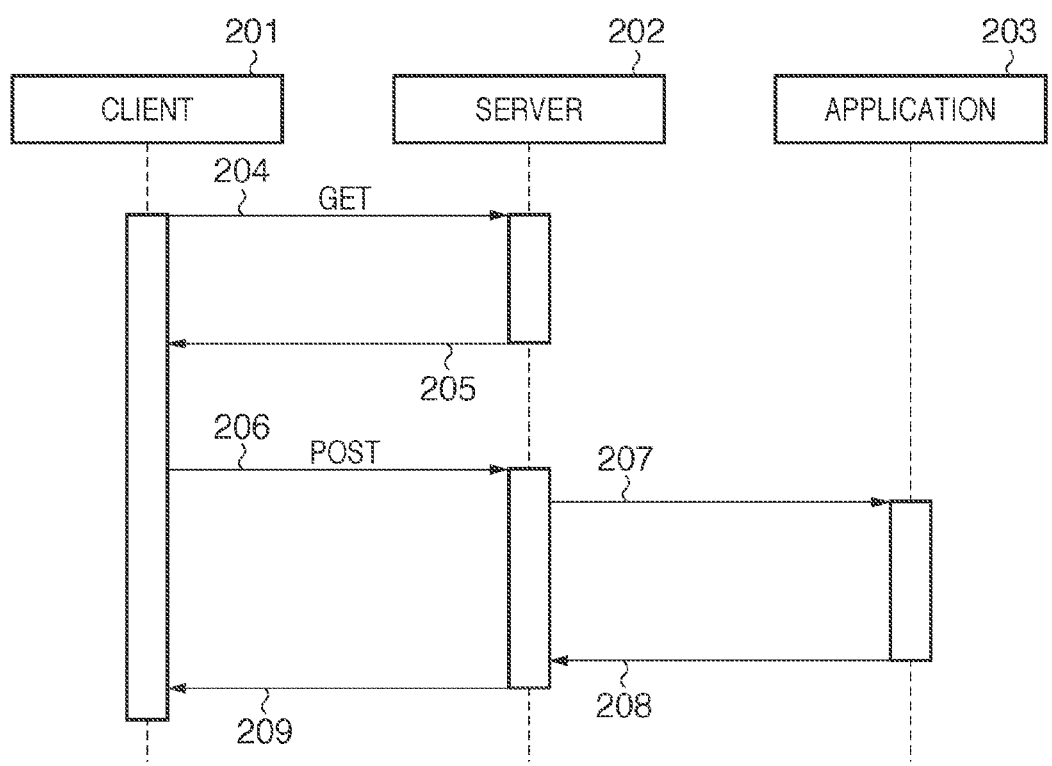
FIG. 2 is a sequence chart showing the flow of requests and responses based on the HTTP protocol.

FIG. 2 is a sequence chart showing the processing flow of requests and responses based on the HTTP protocol. A client 201 is software which transmits an HTTP request (HTTP REQUEST) to a server 202 and receives an HTTP response (HTTP RESPONSE) as a response to the request. In the system configuration shown in FIG. 1 according to the first embodiment of the present invention, the client 201 corresponds to a web browser 7032 (see FIG. 7) incorporated in the printing apparatus 104. The server 202 is software which receives the HTTP request, executes a corresponding application 203, and sends back an HTTP response to the client 201. In the system configuration shown in FIG. 1 according to the first embodiment of the present invention, the server 202 corresponds to the document management application server 102 and printing instruction acceptance application server 103. The application 203 corresponds to a web service provider unit 7011 and application server unit 7022.

The client 201 can transmit an HTTP request to the server 202 by a GET method or POST method. When transmitting an HTTP request 204 for a desired resource from the client 201 to the server 202 by the GET method, the resource is generally designated by the URI (especially URL) form. The server 202 acquires or generates data corresponding to the resource designated by the HTTP request 204, and sends back the data to the client 201 by an HTTP response 205.

A case in which the HTTP request is transmitted by the POST method will be explained. When an HTML document contains a form and the POST method is designated as the transmission method, the following processing is executed. More specifically, information which is input by the user in a form displayed on the web browser of the client 201 is encoded. The pieces of encoded information, that is, the input contents of the form are attached to an HTTP request 206, and transmitted to the server 202. The server 202 analyzes the HTTP request 206 received from the client 201, acquiring the information input by the user. The server 202 activates an application 203 corresponding to the information input by the user. The server 202 transfers, to the application 203 in an application start notification 207, the information input by the user, starting execution of processing. When the application 203 ends the execution of processing, it notifies the server 202 of the processing execution result in an application end notification 208. The server 202 generates an HTTP response 209 from the execution result acquired from the application end notification 208, and sends it back to the client 201.

The server 202 can set a time limit (to be referred to as an application limitation time) by which the application 203 is completed after receiving an HTTP request from the client 201. If processing by the application 203 does not end within the application limitation time, the server 202 interrupts execution of the processing in the application 203, and sends back an HTTP response to the client 201 to indicate that a time-out has occurred in the application. In the example of FIG. 2, the server 202 needs to send back an HTTP request to the client 201 before the time (to be referred to as a request limitation time) when a time-out to an HTTP request occurs in the client 201. In FIG. 2, the application limitation time needs to be set to be equal to or shorter than a time obtained by subtracting the transfer delays of HTTP request and response from the request limitation time.

<Flow of Requests and Responses Using Polling Based on HTTP Protocol>

Figure 3:
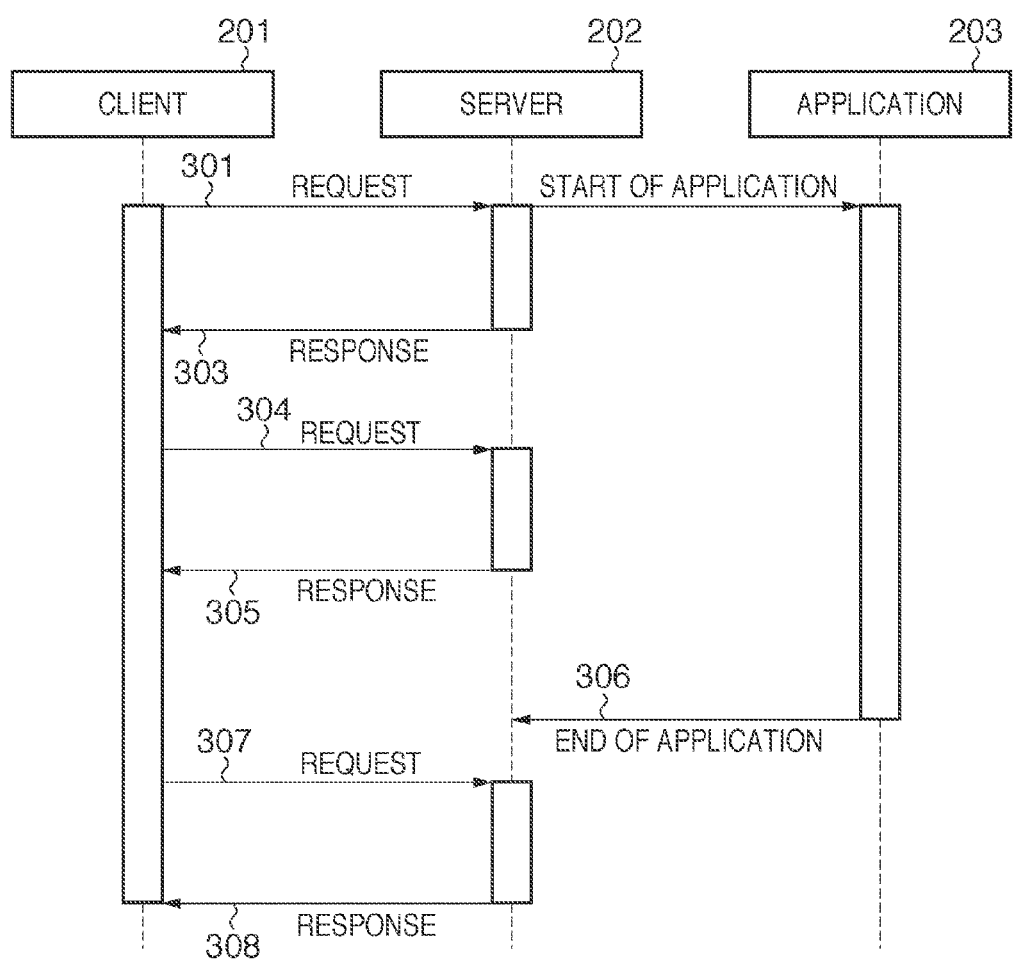
FIG. 3 is a sequence chart showing the flow of requests and responses using polling based on the HTTP protocol.

FIG. 3 is a sequence chart showing the flow of requests and responses using polling based on the HTTP protocol. The client 201 transmits an HTTP request 301 to the server 202 by the POST method. The server 202 analyzes the HTTP request 301 received from the client, acquiring information input by the user. The server 202 activates an application 203 corresponding to the information input by the user. The server 202 transfers, to the application 203 in an application start notification 302, the information input by the user, starting execution of processing. At this time, unlike FIG. 1, when the application 203 starts execution of processing, the server 202 generates an HTTP response 303 and sends it back to the client 201.

Then, the client 201 transmits an HTTP request 304 to the server 202 again by the POST method. At this time, the HTTP request 304 does not contain the information input by the user that has been contained in the HTTP request 301. The HTTP request 304 contains information for inquiring the progress of the processing which has been started by the application 203 in response to the application start notification 302. Upon receiving the HTTP request 304, the server 202 confirms progress information of the processing during execution by the application 203. If the processing is in progress, the server 202 generates an HTTP response 305 containing information to this effect, and sends it back to the client 201. Transmission and reception of the HTTP request 304 and HTTP response 305 between the client 201 and the server 202 are repeated until the processing during execution by the application 203 ends and the application 203 sends an application end notification 306 to the server 202.

When the server 202 receives an HTTP request 307 from the client 201 after receiving the application end notification 306 from the application 203, it generates an HTTP response 308 from the execution result acquired from the application end notification 306, and sends it back to the client 201.

As described above, an HTTP request needs to be repetitively issued to the server 202 until the client 201 receives the processing result of the application 203 after the server 202 transmits the application start notification 302 to the application 203. To receive the processing execution result of the application 203 in real time, it is necessary to shorten the polling interval, that is, the time interval until the HTTP request 304 is transmitted after the HTTP response 303 is received in FIG. 3. This increases the burden on the server. If the time interval is prolonged in consideration of the burden on the server, it becomes difficult to receive in real time an HTTP response containing the execution result.

<Flow of Requests and Responses Using Comet Based on HTTP Protocol>

Figure 4:
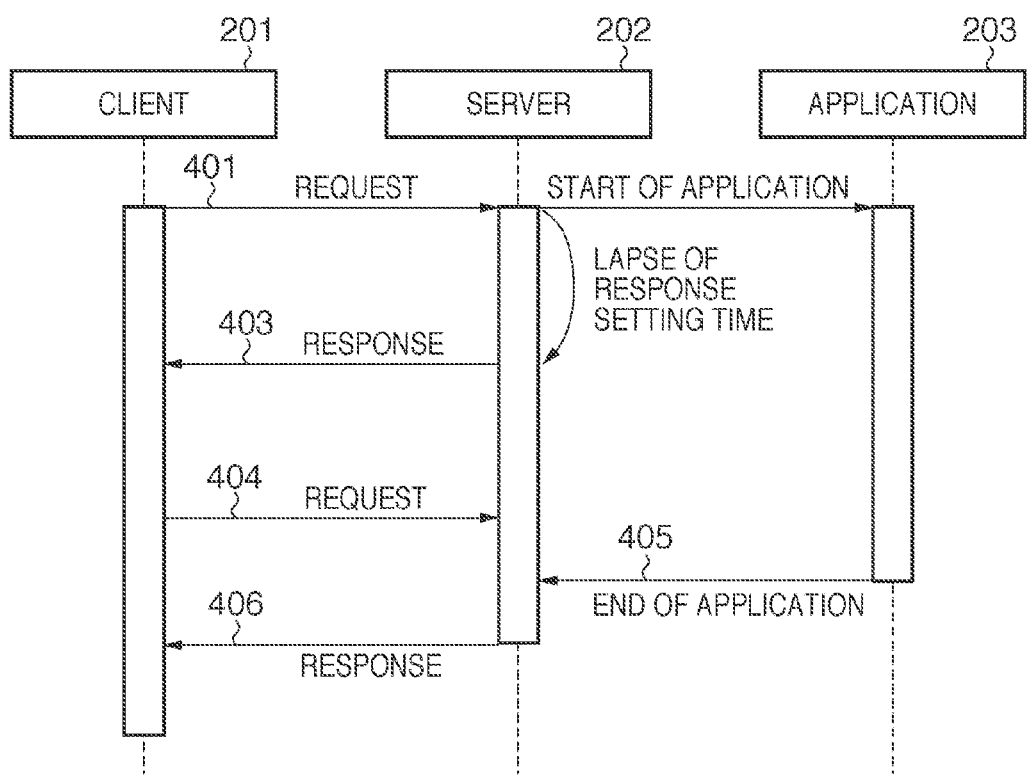
FIG. 4 is a sequence chart showing the flow of requests and responses using Comet based on the HTTP protocol.

FIG. 4 is a sequence chart showing the flow of requests and responses using Comet communication based on the HTTP protocol.

According to the sequence of FIG. 4, the server 202 sets a response time within which an HTTP response is sent back upon receiving an HTTP request from the client 201. This time will be referred to as a response setting time. If processing by the application 203 does not end within the response setting time, the server 202 sends back a blank HTTP response to the client 201. Also in this case, the response setting time should be set shorter than a time obtained by subtracting the transfer times of HTTP request and response from the request limitation time. However, a maximum time is selected to avoid waste of network resources.

The client 201 transmits an HTTP request 401 to the server 202 by the POST method. The server 202 analyzes the HTTP request 401 received from the client 201, acquiring information input by the user. In response to an application start notification 402, the server 202 activates an application 203 corresponding to the information input by the user. The server 202 transfers, to the application 203 in the application start notification 402, the information input by the user, starting execution of processing. If the processing which has been started in response to the application start notification 402 ends within the response setting time, the server 202 acquires the execution result from an application end notification 405, generates an HTTP response 406, and sends it back to the client 201.

If the response setting time has elapsed before the end of the processing which has been started in response to the application start notification 402, the server 202 generates a blank HTTP response 403 and sends it back to the client 201 according to Comet. Thus, the client 201 can receive an HTTP response before generation of a time-out of the HTTP request.

Immediately when the client 201 receives the blank HTTP response 403 from the server 202, it transmits an HTTP request 404 to the server 202, and reconnects to the server. The server 202 does not quickly respond to the received HTTP request, and delays the response until the processing by the application 203 ends or the response setting time elapses. Subsequent procedures are the same as those for the HTTP request 401. These procedures are repeated until the processing by the application 203 ends. More specifically, the flow of the HTTP response 403 and HTTP request 404 is repeated until the application 203 ends processing in progress and transmits the application end notification 405 to the server 202. If the processing which has been started in response to the application start notification 402 ends after reconnection, the server 202 acquires the execution result from the application end notification 405, generates the HTTP response 406, and sends it back to the client 201.

As shown in FIG. 4, a feature of Comet is that while waiting for the completion of processing by the application 203, as shown in FIG. 2, the server 202 properly sends back an HTTP response message and quickly reissues an HTTP request to prevent a time-out of an HTTP request. According to Comet, the status of processing during execution by the application 203 is not confirmed at a predetermined interval, unlike polling as shown in FIG. 3. According to Comet, the server 202 reserves a response even upon receiving an HTTP request from the client 201. If the server 202 generates a message to be sent to the client 201, it transmits the message to the browser using the reserved HTTP response as if the message were a spontaneous message (unsolicited message). The entity of the message is an HTTP response, and even if a firewall for blocking an unsolicited message is interposed, the message can pass through the firewall. In this way, connection is maintained until the response setting time has elapsed, and immediately when the response setting time has elapsed, reconnection is performed. That is, while suppressing generation of a time-out of an HTTP request in the client 201, the HTTP request is kept transmitted to the server 202.

By transmitting requests and responses according to Comet, the client 201 can acquire an HTTP response at the timing when processing during execution by the application 203 ends, in other words, on the initiative of the server 202 in communication. No short-period HTTP response need be repetitively transmitted, unlike status acknowledgement in polling. According to Comet, the web server delays an HTTP response until a message to be sent back is generated, implementing pseudo-communication led by the web server, that is, pseudo-unsolicited communication. If there is no message to be sent back, the web server sends back a blank HTTP response in every response setting time to prevent a time-out of the first HTTP request. Upon receiving the blank HTTP response, the web client issues an HTTP response and maintains connection with the web server to monitor a message generated by the web server. These are the Comet procedures.

Note that Comet control can be implemented by, for example, a program executed by a client and an application program in a web server that is designated by a specific URL. Although the client achieves Comet based on a script provided by the server together with HTML data, equivalent control can also be implemented by an independent application program. This program starts operation in response to issuing of an HTTP request from the web browser. Thus, the program is a script to be executed by the web browser or an independent application program interposed between the web browser and the server. The embodiment takes the following configuration.

<Hardware Configuration of Application Server>

Figure 5:
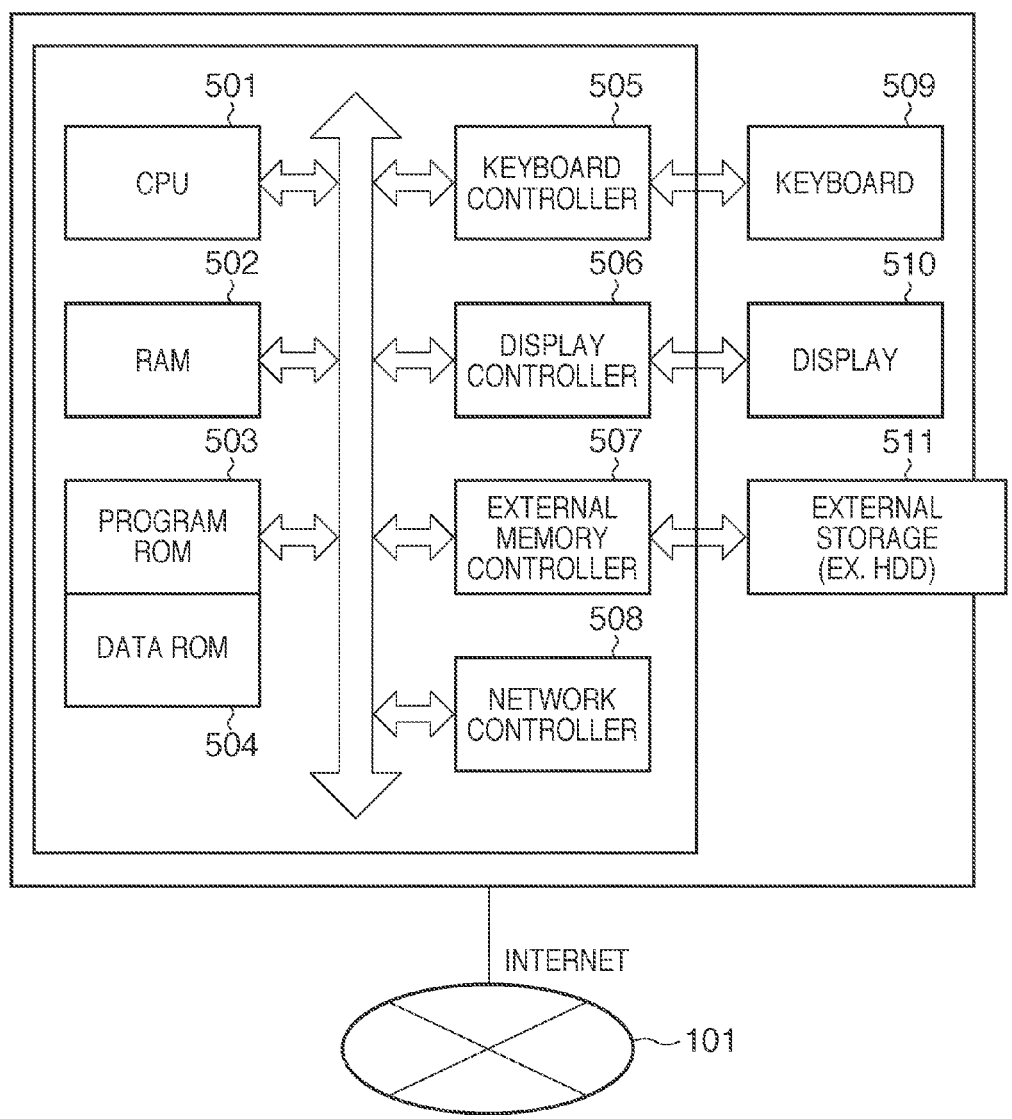
FIG. 5 is a block diagram showing the hardware configurations of a document management application server 102 and printing instruction acceptance application server 103.

FIG. 5 is a block diagram showing the hardware configurations of the document management application server 102 and printing instruction acceptance application server 103 which form the system according to the first embodiment of the present invention. The printing instruction acceptance server includes a web server. The hardware configuration shown in FIG. 5 corresponds to that of a general information processing apparatus. The hardware configuration of a general information processing apparatus is applicable to the document management application server 102 and printing instruction acceptance application server 103 in the embodiment of the present invention.

A CPU 501 executes a program such as an operating system (to be referred to as an OS) or application which is stored in a program ROM 503 or loaded from an external storage 511 into a RAM 502. In the document management application server 102 and printing instruction acceptance application server 103, the control units 1021 and 1031 correspond to the CPU 501. The CPU 501 executes the processes of flowcharts disclosed in the embodiment and a subsequent description.

The RAM 502 functions as a main memory, work area, and the like for the CPU 501. A keyboard controller 505 controls key input from a keyboard 509, or a pointing device (not shown in FIG. 5) connected to a general information processing apparatus. A display controller 506 controls display on various displays 510.

An external memory controller 507 controls data access to the external storage 511 such as a hard disk drive (HDD) which stores various data. In the document management application server 102 and printing instruction acceptance application server 103, the storage units 1022 and 1032 correspond to the external memory controller 507. A network controller 508 is connected to the Internet 101 and executes communication control processing with another device.

<Hardware Configuration of Printing Apparatus>

Figure 6:
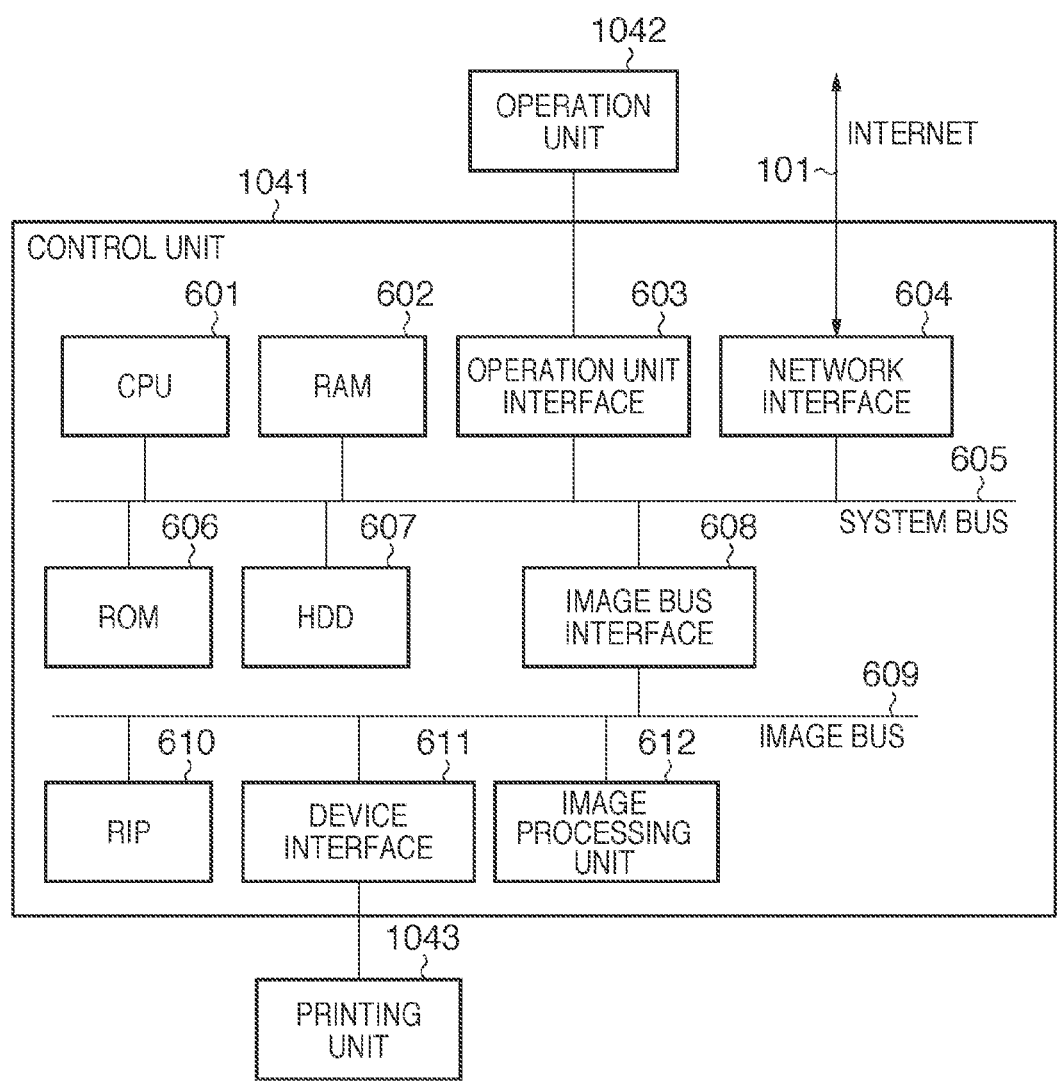
FIG. 6 is a block diagram showing the hardware configuration of a printing apparatus 104.

FIG. 6 is a block diagram showing the hardware configuration of the printing apparatus 104 which forms the system according to the first embodiment of the present invention. The printing apparatus 104 includes a web browser and operates as a web client. The printing apparatus 104 includes the control unit 1041 which controls the printing apparatus. The control unit 1041 controls the printing unit 1043 serving as an image output device. Also, the control unit 1041 is connected to a LAN or public line, and inputs/outputs image information and device information via the LAN or public line.

The control unit 1041 includes a CPU 601. The CPU 601 is connected via a system bus 605 to a RAM 602, ROM 606, hard disk drive (HDD) 607, image bus interface 608, operation unit interface 603, and network interface 604. The CPU 601 executes a program for implementing the procedures of the printing apparatus 104 out of those shown in FIGS. 15 and 16.

The RAM 602 is a main memory for the CPU 601, and functions as a work area, an image memory for temporarily storing image data and programs, and the like. The ROM 606 is a boot ROM. The ROM 606 stores the boot program (startup program) of the printing apparatus. The ROM 606 also stores printing apparatus-specific information such as device information, device name, and serial number of the device.

The hard disk drive (HDD) 607 functions as an external storage area which stores system software, image data, and the like.

The operation unit interface 603 performs input/output to/from the operation unit 1042. The operation unit interface 603 has a function of, for example, outputting, to the operation unit 1042, image data to be displayed on the operation unit 1042, and transmitting, to the CPU 601, information input by the user via the operation unit 1042.

The network interface 604 is connected to the Internet 101 via the firewall 105, and inputs/outputs information.

An image bus interface 608 functions as a bus bridge which connects the system bus 605 to an image bus 609 for transferring image data at high speed, and converts the data structure. The image bus 609 connects a raster image processor (RIP) 610, a device interface 611, and the printing unit 1043.

<Software Configuration>

Figure 7:
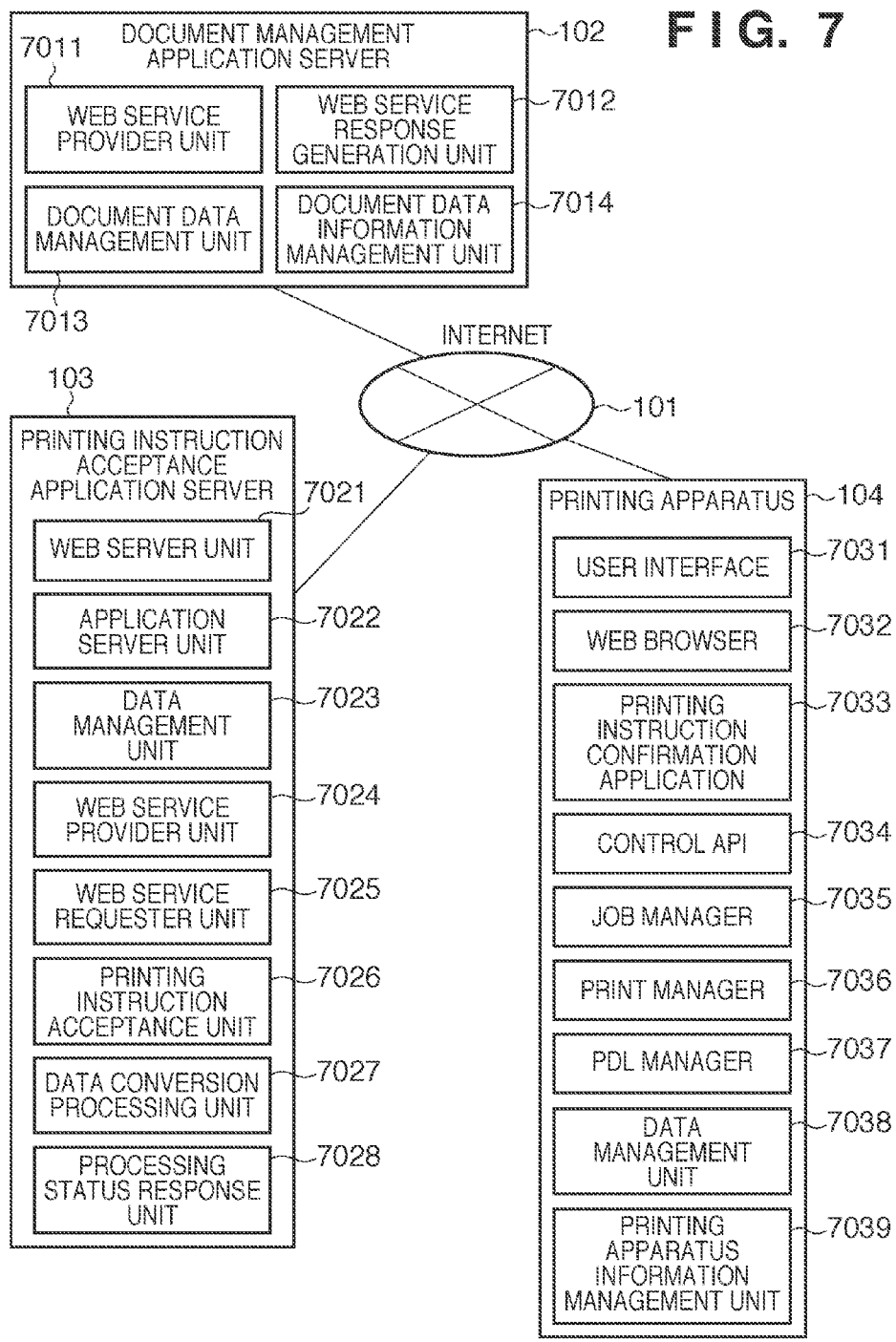
FIG. 7 is a block diagram showing the software configurations of the document management application server 102, printing instruction acceptance application server 103, and printing apparatus 104.

FIG. 7 is a block diagram showing the software configurations of the document management application server 102, printing instruction acceptance application server 103, and printing apparatus 104 which form the system according to the first embodiment of the present invention.

The document management application server 102 includes the web service provider unit 7011, a web service response generation unit 7012, a document data management unit 7013, and a document data information management unit 7014. The storage unit 1022 (external storage 511) stores these building components as program files. Various functions provided as web applications by the document management application server 102 are implemented by loading these program files into the RAM 502 and executing them by the CPU 501.

The web service provider unit 7011 accepts a web service request from a web service requester unit 7025 of the printing instruction acceptance application server 103 via the Internet 101. In accordance with the web service request, the web service response generation unit 7012 executes processing. When executing processing corresponding to the web service request, the web service response generation unit 7012 invokes the document data management unit 7013 or document data information management unit 7014, and generates an execution result. The document data management unit 7013 executes processes such as registration, search, and deletion of document data saved in the storage unit 1022. The document data information management unit 7014 executes processes such as registration, search, and deletion of related information accessory to document data. In the embodiment, the contents of concrete processing to be executed by the document management application server will be described in detail in a description of flowcharts disclosed later.

The printing instruction acceptance application server 103 includes a web server unit 7021, the application server unit 7022, a data management unit 7023, a web service provider unit 7024, the web service requester unit 7025, a printing instruction acceptance unit 7026, a data conversion processing unit 7027, and a processing status response unit 7028. The storage unit 1032 (external storage 511) stores these building components as program files. Various functions provided as web applications by the printing instruction acceptance application server 103 are implemented by loading these program files into the RAM 502 and executing them by the CPU 501.

The web server unit 7021 accepts an HTTP request from the web browser 7032 of the printing apparatus 104 via the Internet 101. Upon accepting the HTTP request, the web server unit 7021 invokes the application server unit 7022 and executes processing corresponding to the request. As processing execution results, the application server unit 7022 sends back dynamically generated response information such as HTML information to the web server unit 7021. Upon accepting the execution results from the application server unit, the web server unit 7021 sends them back to the web browser 7032 of the printing apparatus 104. Also, the application server unit 7022 invokes an external web service from the web service requester unit 7025 via the Internet 101. In the present invention, the application server unit 7022 transmits a web service request to the web service provider unit 7011 of the document management application server 102, and receives a response to it.

The web service provider unit 7024 accepts a web service request from a printing instruction confirmation application 7033 of the printing apparatus 104 via the Internet 101. In accordance with the web service request, the printing instruction acceptance unit 7026, data conversion processing unit 7027, and processing status response unit 7028 execute processes, and send back responses to the printing instruction confirmation application 7033 of the printing apparatus 104. The data management unit 7023 is executed when data needs to be made permanent in executing various processes in the printing instruction acceptance application server 103. The data management unit 7023 performs write in and readout from the storage unit 1032 (external storage 511). In the present invention, the contents of concrete processing to be executed by the printing instruction acceptance application server 103 will be described in detail in a description of flowcharts disclosed later.

The printing apparatus 104 includes a user interface 7031, the web browser 7032, the printing instruction confirmation application 7033, a control API 7034, a job manager 7035, a print manager 7036, a PDL manager 7037, a data management unit 7038, and a printing apparatus information management unit 7039. The hard disk drive (HDD) 607 stores these building components as program files. Various functions provided by the printing apparatus 104 are implemented by loading these program files into the RAM 602 and executing them by the CPU 601.

The user interface 7031 is a program which intervenes between the device and a user operation when the user makes various operations and settings to the printing apparatus 104. In accordance with user operation information input via the operation unit 1042, the user interface 7031 transfers operation information to various programs (to be described later), and requests execution of corresponding processing or sets data.

The web browser 7032 is a program for HTTP-connecting the printing apparatus 104 to the printing instruction acceptance application server 103 via the Internet 101, and executing various processes provided by the printing instruction acceptance application server 103. The web browser 7032 is displayed on the operation unit 1042 and accepts a user input. As described above, the user operation information input to the web browser is transferred to various programs (to be described later) in the printing apparatus via the user interface 7031.

The printing instruction confirmation application 7033 is a program which transmits a web service request to the web service provider unit 7024 of the printing instruction acceptance application server 103 via the Internet 101, and receives a response to the request. The printing instruction confirmation application 7033 may be a program independent of the web browser 7032 or a program (script) provided by the web server.

The control API 7034 provides, to the printing instruction confirmation application 7033, interfaces with the job manager 7035, print manager 7036, and PDL manager 7037. This can reduce the dependence between programs and enhance the diversion of them.

The job manager 7035 interprets various processes designated by the printing instruction confirmation application 7033 via the control API 7034, and gives instructions to the print manager 7036 and PDL manager 7037. The job manager 7035 centrally manages hardware processes to be executed by the printing apparatus 104.

The print manager 7036 manages and controls print processing designated by the job manager 7035. The PDL manager 7037 converts print data designated by the job manager 7035 into PDL data. The data management unit 7038 manages and controls data saved in the hard disk drive (HDD) 607. The printing apparatus information management unit 7039 manages information specific to the printing apparatus 104, printing apparatus installation location information (including even information such as an IP address on the network), and the like which are stored in the ROM 606.

<Web Browser Screen Arrangement>

FIG. 8 exemplifies the screen arrangement of the web browser 7032 displayed on the operation unit 1042 of the printing apparatus 104 according to the first embodiment of the present invention. A web browser screen 801 displays a tab 802, URL input field 809, OK button 810, progress bar 808, content display area 803, return button 804, advance button 805, reload button 807, stop button 806, and status display area 811.

The tab 802 is used to switch the screen between functions (copy, box, send, and options) provided by the printing apparatus 104 other than the function of the web browser 7032. The URL input field 809 is used when the user inputs the URL of a resource he wants. When the user presses the field, a virtual full keyboard (not shown) for inputting characters appears. The user can input a desired character string from soft keys which are arranged on the virtual full keyboard similarly to the key-top.

The OK button 810 is a soft key for finalizing an input URL character string. When the URL is finalized, the web browser 7032 transmits an HTTP request to the input URL. The progress bar 808 indicates the progress of acquiring a response to an HTTP request. The content display area 803 displays an acquired HTTP response. The return button 804 is a soft key for tracing back the web browser display history, and displaying again a screen which has been displayed before the currently displayed screen. The advance button 805 is a soft key for displaying again a screen which has been displayed after currently displayed contents when the screen is displayed by tracing back the screen display history. The reload button 807 is used to acquire and display again a currently displayed screen. The stop button 806 is a soft key for stopping an HTTP request during execution. The status display area 811 is used to display messages from various functions of the printing apparatus. Even while the web browser screen 801 is displayed, the status display area 811 can display a message from a scanner, printer, or another function to draw user attention. Similarly, the status display area 811 can display a message even from the web browser 7032. The web browser 7032 displays the URL character string of a link destination, the title character string of contents, a message designated by a script, and the like.

<Document Management Table>

FIG. 9 exemplifies a database table which manages document data and document data information saved in the storage unit 1022 (external storage 511) of the document management application server 102 according to the embodiment of the present invention. A document management table 901 includes a document ID column 902, document name column 903, document management database item column 904, and document data column 905. The document ID column 902 stores a number for uniquely identifying document data saved in the storage unit 1022 of the document management application server 102. The document name column 903 stores the name of document data saved in the storage unit 1022 of the document management application server 102. The document management database item column 904 stores an item value necessary to manage document data, in addition to those in the document ID column 902 and document name column 903. The item value stored in the document management database item column 904 changes depending on the implementation of the document management application server 102. In the embodiment of the present invention, the item value stored in the document management database item column 904 is arbitrary, and a description thereof will be omitted. In the embodiment of the present invention, pieces of information stored in the document ID column 902, document name column 903, and document management database item column 904 will be called document data information. The document data information management unit 7014 executes processes regarding operations such as registration, search, and deletion in the document ID column 902, document name column 903, and document management database item column 904 in the document management table 901. The document data column 905 stores save location information of document data or the document data itself saved in the storage unit 1022 (external storage 511) of the document management application server 102. In the embodiment of the present invention, the item value stored in the document data column 905 is arbitrary.

Processes in respective steps in the cloud printing system according to the first embodiment of the present invention will be explained in detail with reference to FIGS. 10 to 16B.

<Specifying of Document to be Printed>

FIG. 10 is a flowchart until the web browser 7032 of the printing apparatus 104 issues an instruction to the printing instruction acceptance application server 103 to print document data saved in the document management application server 102 in the cloud printing system according to the embodiment.

In step S1001, the printing apparatus 104 loads, into the RAM 602, the web browser 7032 saved in the hard disk drive (HDD) 607. Upon completion of loading, the CPU 601 executes the web browser 7032 loaded into the RAM 602, and displays it on the operation unit 1042.

In step S1002, the web browser 7032 transmits an HTTP request to acquire, from the printing instruction acceptance application server 103, information about a list of document data managed by the document management application server 102. The document data list information indicates document data information about all document data saved in the storage unit 1022 of the document management application server 102. At this time, a method of inputting URL information of the printing instruction acceptance application server 103 to the URL input field 809 of the web browser screen 801 is arbitrary. URL information may be saved in advance in the hard disk drive (HDD) 607 of the printing apparatus 104, and set when the CPU 601 activates the web browser 7032 in step S1001. Alternatively, the user of the web browser 7032 may manually set (input) URL information.

In step S1003, upon receiving the HTTP request from the web browser 7032, the web server unit 7021 of the printing instruction acceptance application server 103 invokes the application server unit 7022. The application server unit 7022 transmits a web service request from the web service requester unit 7025 to the web service provider unit 7011 of the document management application server 102 via the Internet 101. The web service request is a request to acquire information about a list of document data managed by the document management application server 102.

In step S1004, the web service provider unit 7011 of the document management application server 102 receives the web service request from the web service requester unit 7025 of the printing instruction acceptance application server 103. The web service provider unit 7011 transfers the received web service request to the web service response generation unit 7012. As processing corresponding to the web service request, the web service response generation unit 7012 invokes the document data information management unit 7014, and acquires document data information stored in the document management table 901. The web service provider unit 7011 transmits the document data information acquired by the web service response generation unit 7012 to the web service requester unit 7025 of the printing instruction acceptance application server 103.

In step S1005, the web service requester unit 7025 of the printing instruction acceptance application server 103 receives and acquires the document data information from the web service provider unit 7011 of the document management application server 102. The application server unit 7022 of the printing instruction acceptance application server 103 dynamically generates a document list screen 1101 of the HTML format from the document data information acquired by the web service requester unit 7025, and sends it back to the web server unit 7021. The web server unit 7021 sends back the document list screen 1101 to the web browser 7032 of the printing apparatus 104.

In step S1006, the printing apparatus 104 displays, on the web browser 7032, the document list screen 1101 received as an HTTP response from the web server unit 7021 of the document management application server 102.

Figure 11:
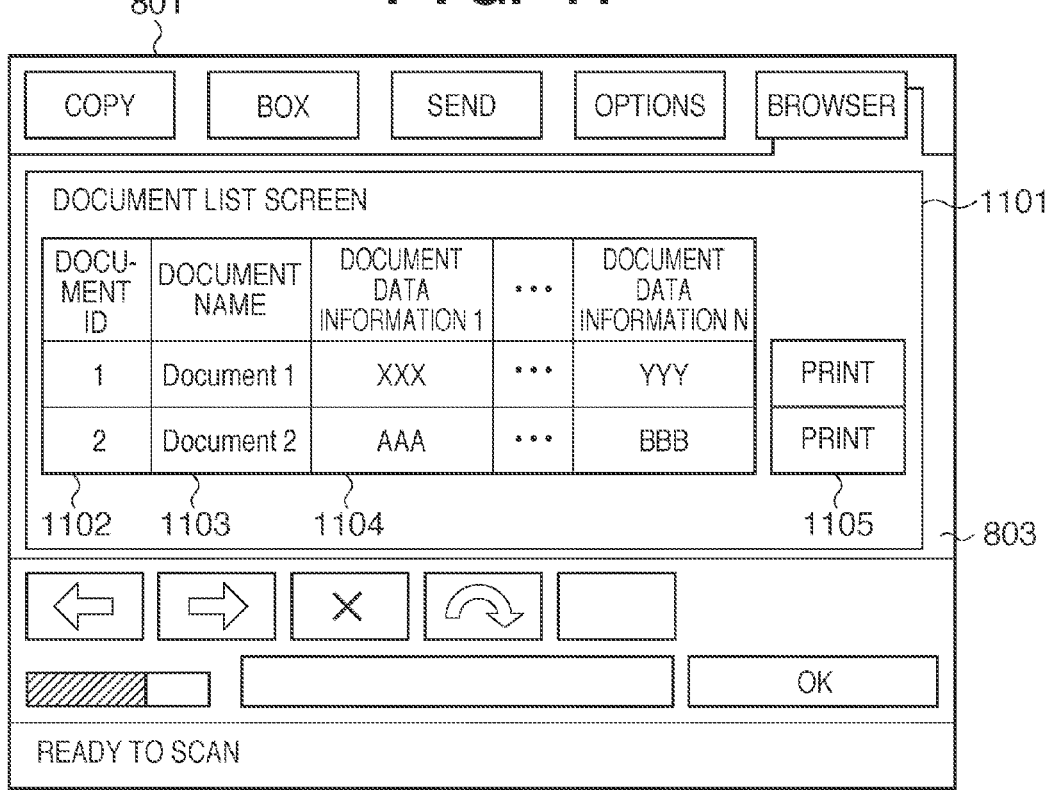
FIG. 11 is a view for explaining a document list screen displayed on the web browser 7032.

FIG. 11 exemplifies the document list screen displayed on the web browser 7032 in step S1006 of FIG. 10. The document list screen 1101 includes a document ID display area 1102, document name display area 1103, document data information display area 1104, and document print button 1105. The building components of the document list screen 1101 are displayed in correspondence with each document data information. The document ID display area 1102 displays an item value stored in the document ID column 902 of the document management table 901. The document name display area 1103 displays an item value stored in the document name column 903 of the document management table 901. The document data information display area 1104 displays an item value stored in the document management database item column 904 of the document management table 901. The document print button 1105 is used to issue an instruction to the printing instruction acceptance application server 103 to print a document corresponding to identification information (ID) displayed in the document ID display area 1102.

Referring back to FIG. 10, in step S1007, the user presses an arbitrary print button 1105 displayed on the document list screen 1101, thereby designating a document to be printed. This document data will be called specific document data. When the user presses the document print button 1105, the web browser 7032 of the printing apparatus 104 transmits a printing instruction HTTP request to the web server unit 7021 of the printing instruction acceptance application server 103 via the Internet 101 together with an item value displayed in the document ID display area 1102 associated with the document print button 1105. In the embodiment, the instruction to print is described as a printing instruction. However, this instruction requests conversion of print data, and can also be referred to as a specific document data conversion request.

In step S1008, the web server unit 7021 of the printing instruction acceptance application server 103 receives the printing instruction HTTP request from the web browser 7032 of the printing apparatus 104. Upon receiving the printing instruction HTTP request, the web server unit 7021 invokes the application server unit 7022. The application server unit 7022 invokes the printing instruction acceptance unit 7026, and registers the received HTTP request in the data management unit 7023 as preparations for executing a printing instruction.

Figure 12:
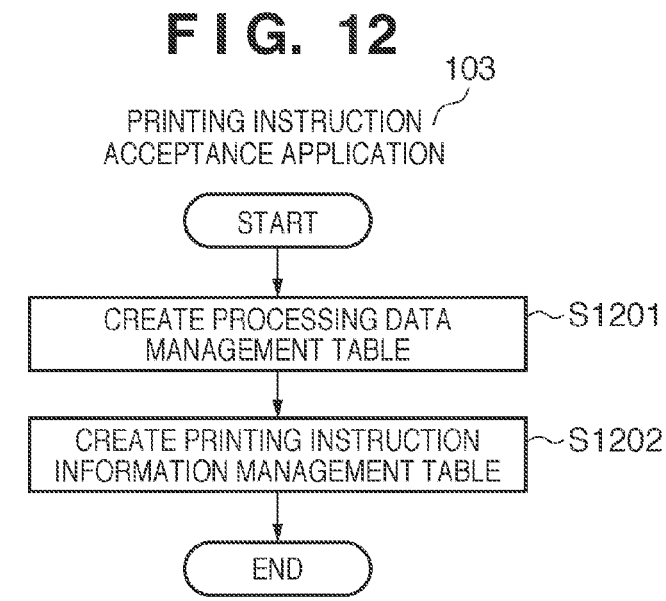
FIG. 12 is a flowchart for explaining in detail printing instruction registration in the flowchart shown in FIG. 10 in the first embodiment.

FIG. 12 is a flowchart showing details of step S1008 in FIG. 10. Processing in FIG. 12 is printing instruction registration processing executed by the application server unit 7022 of the printing apparatus 104 by invoking the printing instruction acceptance unit 7026. FIG. 13 exemplifies a database table which manages printing instruction information in the data management unit 7023 in printing instruction registration processing.

The database which manages printing instruction information includes a printing instruction information management table 1301 which manages printing instruction information, and a print data management table 1302 which makes data permanent when converting document data into print data in accordance with a printing instruction. The printing instruction information management table 1301 includes a printing instruction ID column 13011, document ID column 13012, and print data management table reference ID column 13013. The printing instruction ID column 13011 stores a unique identification number which is issued by the printing instruction acceptance unit 7026 in accordance with a received printing instruction HTTP request. The document ID column 13012 stores an item value to be displayed in the document ID display area 1102 designated in step S1007. The print data management table reference ID column 13013 stores a number which is issued by the printing instruction acceptance unit 7026 to uniquely identify the print data management table 1302. The print data management table 1302 includes a management ID column 13021, device ID column 13022, progress column 13023, and print data column 13024. The management ID column 13021 stores a unique identification number which is issued by the printing instruction acceptance unit 7026 in accordance with a received printing instruction HTTP request. The device ID column 13022 stores information for identifying the printing apparatus 104 serving as the source of the printing instruction HTTP request received in step S1008. The information for identifying the printing apparatus 104 corresponds to a request IP address, printing apparatus name, serial number of the printing apparatus, and the like which are contained in an HTTP request. The progress column 13023 stores an item value indicating the progress of conversion processing from document data into print data. When the printing instruction acceptance unit 7026 creates the print data management table 1302, a value indicating "wait for processing" is stored as an initial value. After that, the data conversion processing unit 7027 (to be described later) registers and updates values such as "during processing", "completed", and "error end" in accordance with the processing status. The print data column 13024 stores print data created by the data conversion processing unit 7027 (to be described later).

In step S1201, the printing instruction acceptance unit 7026 creates a print data management table 1302 corresponding to a received printing instruction HTTP request in the storage unit 1032 (external storage 511) of the printing instruction acceptance application server 103.

In step S1202, the printing instruction acceptance unit 7026 creates a printing instruction information management table 1301 corresponding to the received printing instruction HTTP request in the storage unit 1032 (external storage 511) of the printing instruction acceptance application server 103.

Subsequent to the above printing instruction registration processing, in step S1009, a completion notification (reception response) that the printing instruction acceptance unit 7026 has created the print data management table and printing instruction information management table 1301 is sent back to the application server unit 7022. The application server unit 7022 dynamically generates an HTML screen containing an activation script for activating the web browser printing instruction confirmation application 7033 of the printing apparatus 104, and sends it back to the web server unit 7021. The web server unit 7021 sends the HTML screen to the web browser 7032 of the printing apparatus 104.

In step S1010, the printing apparatus 104 displays, on the web browser 7032, the screen received as an HTTP response from the web server unit 7021 of the printing instruction acceptance application server 103.

Figure 14:
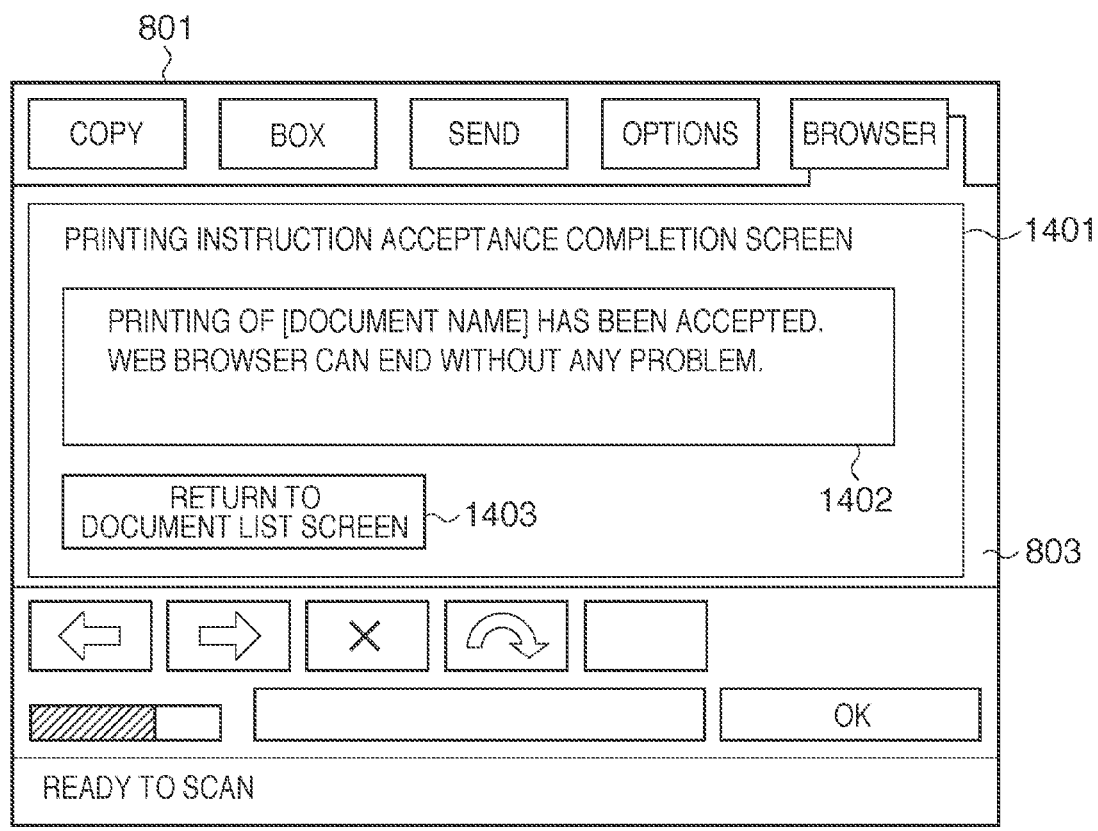
FIG. 14 is a view for explaining a screen displayed on the web browser 7032 at the end of printing instruction registration in FIG. 10.

FIG. 14 exemplifies a printing instruction acceptance completion screen displayed on the web browser 7032 in step S1010 according to the embodiment of the present invention. A printing instruction acceptance completion screen 1401 includes a printing instruction acceptance completion message display area 1402 and document list display button 1403. The printing instruction acceptance completion message display area 1402 displays a character string which notifies the user that the printing instruction HTTP request received in step S1008 has been processed appropriately. When the user presses the document list display button 1403, steps S1002 to S1006 are executed, displaying the document list screen shown in FIG. 11 again on the web browser 7032.

<Print Data Conversion Processing>

FIG. 15 is a flowchart until document data corresponding to an item value stored in the document ID column 13012 of the printing instruction information management table 1301 is converted into a data format interpretable and printable by the printing apparatus 104 in the cloud printing system according to the embodiment. The data conversion processing unit 7027 of the printing instruction acceptance application server 103 executes the sequence in FIG. 15. Processing to be executed according to the flowchart shown in FIG. 15 can be executed parallelly and asynchronously regardless of whether the flowchart shown in FIG. 10 is during or before execution.

In step S1501, the data conversion processing unit 7027 refers to printing instruction information registered in the printing instruction information management table 1301 of the printing instruction information management database via the data management unit 7023.

In step S1502, the data conversion processing unit 7027 counts pieces of printing instruction information registered in the printing instruction information management table 1301 looked up in step S1501 via the data management unit 7023. If no printing instruction information is registered, the process ends.

If the data conversion processing unit 7027 confirms in step S1502 that printing instruction information is registered, it acquires one printing instruction information via the data management unit 7023 and temporarily saves it in the RAM 602 of the printing apparatus 104 in step S1503. At this time, the acquired printing instruction information is deleted from the printing instruction information management table 1301.

In step S1504, the data conversion processing unit 7027 acquires, from the document management application server 102, document data corresponding to an item value stored in the document ID column 13012 for the printing instruction information saved in the RAM 602. For this purpose, the printing instruction acceptance application server 103 invokes the web service requester unit 7025, and transmits a web service request to the web service provider unit 7011 of the document management application server 102 via the Internet 101. This request is to acquire document data managed by the document management application server 102.

In step S1505, the web service provider unit 7011 of the document management application server 102 receives the web service request from the web service requester unit 7025 of the printing instruction acceptance application server 103. The web service provider unit 7011 transfers the received web service request to the web service response generation unit 7012. As processing corresponding to the web service request, the web service response generation unit 7012 invokes the document data management unit 7013, and acquires, from the document management table 901, document data corresponding to a document ID contained in the received web service request. The web service provider unit 7011 transmits the document data acquired by the web service response generation unit 7012 to the web service requester unit 7025 of the printing instruction acceptance application server 103.

In step S1506, the web service requester unit 7025 of the printing instruction acceptance application server 103 receives the document data received from the web service provider unit 7011 of the document management application server 102, and transfers it to the data conversion processing unit 7027.

In steps S1507 to S1509, the data conversion processing unit 7027 converts the document data received in step S1506 into print data. Steps S1508 and S1509 are repeated till the completion of conversion processing. In step S1507, the data conversion processing unit 7027 starts conversion processing from the document data received in step S1506 into print data. In step S1508, the data conversion processing unit 7027 converts the document data into print data. After the start of print data conversion processing in step S1507, the data conversion processing unit 7027 changes a value in the corresponding progress column 13023 of the print data management table 1302 via the data management unit 7023 in step S1509. If the conversion processing continues in step S1508, the value is updated to "during processing". If the data conversion processing is normally completed in step S1508, the value is updated to "completed". If an error or the like occurs and the data conversion processing is interrupted, the value is updated to "error". If the value of the progress column 13023 is updated to "completed" or "error" in step S1509, the data conversion processing ends, and the process advances to step S1510.

In step S1510, the data conversion processing unit 7027 refers to the value in the corresponding progress column 13023 of the print data management table 1302 via the data management unit 7023. At this time, if the value of the progress column 13023 is "error", the printing instruction information saved in the RAM 602 is registered again in the printing instruction information management table 1301 in step S1511.

If the value of the progress column 13023 is "completed", the data conversion processing unit 7027 saves the print data having undergone data conversion in the print data column 13024 of the print data management table 1302 via the data management unit 7023 in step S1512.

In step S1513, the data conversion processing unit 7027 deletes the printing instruction information saved in the RAM 602, and the process ends.

<Monitoring of Completion of Print Data Conversion>

FIGS. 16A and 16B are flowcharts until the printing apparatus 104 performs print processing after the web browser 7032 of the printing apparatus 104 issues a document data printing instruction to the printing instruction acceptance application server 103 in FIG. 10 in the cloud printing system according to the embodiment.

In step S1601, the web browser 7032 of the printing apparatus 104 displays the printing instruction acceptance completion screen 1401 which has been received as an HTTP response from the web server unit 7021 of the printing instruction acceptance application server 103 in step S1010. In addition, the web browser 7032 executes the startup script of the printing instruction confirmation application 7033 contained in the screen. At this time, the user of the web browser 7032 of the printing apparatus 104 does not operate the printing apparatus 104 until printing of print data is completed and a message to this effect is displayed in step S1618 (to be described later). After the end of step S1601, a document data printing instruction can be newly transmitted to the printing instruction acceptance application server 103 according to the flowchart shown in FIG. 10. Even when printing of a document is parallelly executed, this document data printing instruction is issued independently of the processing and processing result.

Figure 17:
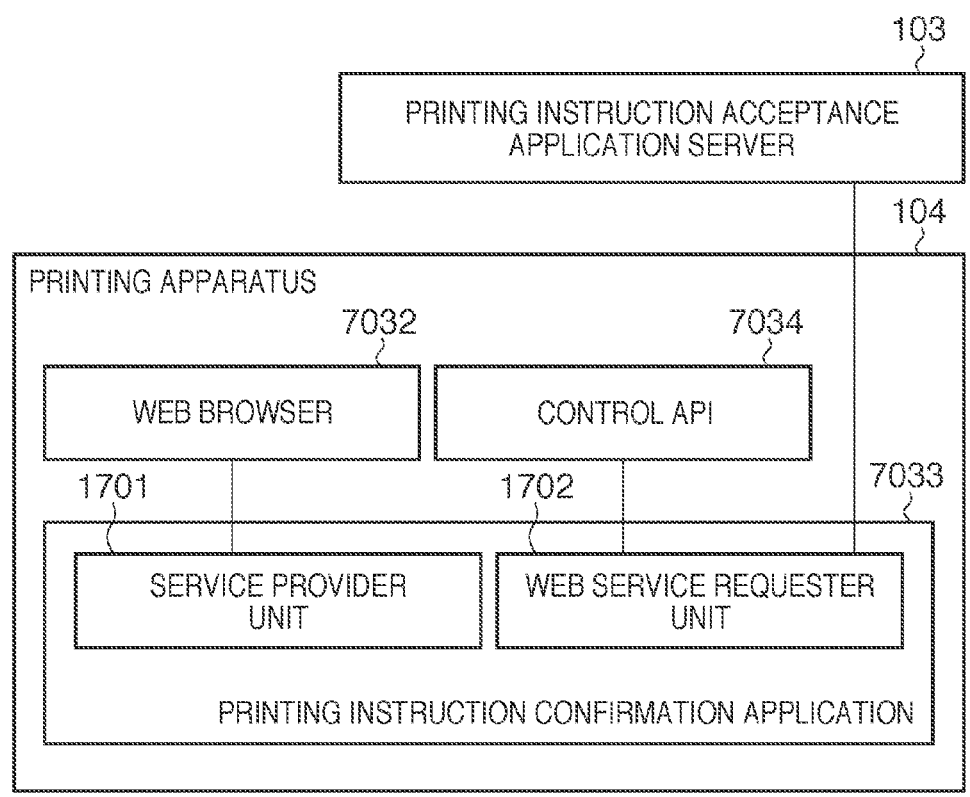
FIG. 17 is a block diagram showing the software configuration of a printing instruction confirmation application 7033.

FIG. 17 is a block diagram showing the internal software configuration of the printing instruction confirmation application 7033 which forms the printing apparatus 104 in the cloud printing system according to the embodiment. The printing instruction confirmation application 7033 incorporates a service provider unit 1701 and web service requester unit 1702. The activation scrip of the printing instruction confirmation application 7033 transmits a service request to the service provider unit 1701 of the printing instruction confirmation application 7033 to activate the printing instruction confirmation application 7033. When transmitting the service request, the printing instruction confirmation application 7033 acquires information specific to the printing apparatus 104 such as device information, device name, and serial number of the device from the ROM 606 via the printing apparatus information management unit 7039 of the printing apparatus 104, and transmits them together.

In step S1602, upon receiving the service request from the web browser 7032, the printing instruction confirmation application 7033 transmits a web service request from the web service requester unit 1702 to the web service provider unit 7024 of the printing instruction acceptance application server 103 via the Internet 101. This web service request is an HTTP request message, and contains information specific to the printing apparatus 104 that has been acquired from the ROM 606 of the printing apparatus 104. This message will also be called a progress information request, and the progress is confirmed from this message. Subsequent processes in steps S1602 to S1609 are repetitively executed by performing communication using Comet until the printing instruction acceptance application server 103 completes print data conversion processing shown in FIG. 15. Note that communication can also be done not by Comet but by almost the same procedures as Comet. The web service request transmitted by the printing instruction confirmation application 7033 in step S1602 contains even information which allows the server to identify communication using Comet (or almost the same procedures as Comet). This information may explicitly indicate Comet, but need not be explicit as long as Comet can be identified from the type of request or the like.

In step S1603, the web service provider unit 7024 of the printing instruction acceptance application server 103 receives the web service request from the printing instruction confirmation application 7033 via the Internet 101. The web service provider unit 7024 saves, in the RAM 502 via the data management unit 7023, the information specific to the printing apparatus 104 that is contained in the service request. The web service request received in step S1603 contains the information indicating Comet. To meet the HTTP request according to the Comet procedures, the web service provider unit 7024 sets, in a timer, a response setting time determined not to generate a time-out in an HTTP request/response, and starts measuring the time. Also, the web service provider unit 7024 delays a response to the HTTP request until the timer expires or conversion processing is completed.

In step S1604, the web service provider unit 7024 of the printing instruction acceptance application server 103 invokes the processing status response unit 7028 as processing corresponding to the web service request. The processing status response unit 7028 searches data saved in the print data management table 1302 for data for which the value of the device ID column 13022 coincides with the information specific to the printing apparatus 104 that has been saved in the RAM 502 in step S1603. If no corresponding data is detected, the process advances to step S1607. If one or more corresponding data are detected, the processing status response unit 7028 checks the value of the progress column 13023 for each data. If the value of the progress column 13023 is one other than "completed", the process advances to step S1607; if it is "completed", to step S1605.

In step S1605, the processing status response unit 7028 acquires print data stored in the print data column 13024 and the value of the management ID column 13021 for data for which the value of the device ID column 13022 coincides with the information specific to the printing apparatus 104 and the value of the progress column 13023 is "completed" in step S1604. The processing status response unit 7028 saves the acquired print data and value in the RAM 502 via the data management unit 7023 as values to be sent back by an HTTP response.

In step S1606, the web service provider unit 7024 invokes the processing status response unit 7028 as processing corresponding to the web service request received in step S1603. The processing status response unit 7028 stores, in the HTTP response, the print data and the value of the management ID column 13021 that have been saved in the RAM 502 in step S1605.

If no corresponding data is detected in step S1604, or if the value of the progress column 13023 for corresponding data is one other than "completed", the processing status response unit 7028 does not store any data in the HTTP response. The process then returns to step S1604 to repetitively execute the processes in steps S1604 to S1607 as long as the HTTP connection can be maintained in step S1607, in other words, until the response setting time set in the timer in step S1603 expires. If the response setting time expires or conversion processing ends, the process advances to step S1608.

In step S1608, the processing status response unit 7028 of the printing instruction acceptance application server 103 transmits the HTTP response to the printing instruction confirmation application 7033. If the process branches from step S1607, the processing status response unit 7028 sends back a blank HTTP response. If the process shifts from step S1606, the processing status response unit 7028 sends back the HTTP response created in step S1606. Steps S1607 and S1608 can directly employ, for example, Comet procedures in the server.

In step S1609, the printing instruction confirmation application 7033 checks the HTTP response received from the processing status response unit 7028 of the printing instruction acceptance application server 103. If the HTTP response does not contain print data, the process advances to step S1602, and the printing instruction confirmation application 7033 transmits a web service request again to the web service provider unit 7024 of the printing instruction acceptance application server 103. If the HTTP response contains print data, the process advances to step S1610.

In step S1610, the printing instruction confirmation application 7033 internally invokes the control API 7034 from the web service requester unit 1702 to register, in the job manager 7035, the print data acquired in step S1609, and start print processing. Also, the printing instruction confirmation application 7033 invokes the data management unit 7038 to save the value of the management ID column 13021 in the RAM 602 in association with the print data registered in the job manager 7035.

In step S1611, the printing instruction confirmation application 7033 internally invokes the control API 7034 from the web service requester unit 1702 to monitor the job manager 7035. The job manager 7035 is kept monitored till the completion of print processing for the print data registered in step S1610.

If the printing instruction confirmation application 7033 confirms in step S1611 that the print processing is completed, it transmits a web service request to the web service provider unit 7024 of the printing instruction acceptance application server 103 in step S1612. The web service request is transmitted from the web service requester unit 1702 via the Internet 101, and contains information indicating that the printing apparatus 104 has completed the print processing, and the value of the management ID column 13021 that has been saved in the RAM 602. The information indicating that the print processing has been completed is one indicating successful printing or a printing failure, and is expressed by an arbitrary character string. The format of the character string is arbitrary.

In step S1613, the web service provider unit 7024 of the printing instruction acceptance application server 103 receives the web service request from the printing instruction confirmation application 7033 via the Internet 101. The web service provider unit 7024 invokes the processing status response unit 7028, and analyzes the printing completion information contained in the web service request. If the printing completion information indicates successful printing, the process advances to step S1614; if it indicates a printing failure, to step S1616.

In step S1614, the processing status response unit 7028 of the printing instruction acceptance application server 103 invokes the data management unit 7023. The invoked data management unit 7023 deletes, from the print data management table 1302, data corresponding to the value of the management ID column 13021 that is contained in the web service request received from the printing instruction confirmation application 7033.

In step S1615, the processing status response unit 7028 of the printing instruction acceptance application server 103 generates information indicating normal end of printing end processing in the printing instruction acceptance application server 103. The processing status response unit 7028 transmits the information to the web service requester unit 1702 of the printing instruction confirmation application 7033. The information indicating normal end of printing end processing in the printing instruction acceptance application server 103 takes the form of a character string to be displayed in the status display area 811 of the operation unit 1042 of the printing apparatus 104.

In step S1616, the processing status response unit 7028 of the printing instruction acceptance application server 103 invokes the data management unit 7023. The invoked data management unit 7023 changes, to "printing error", the value of the progress column 13023 for data corresponding to the value of the management ID column 13021 in the print data management table 1302 that is contained in the web service request received from the printing instruction confirmation application 7033.

In step S1617, the processing status response unit 7028 of the printing instruction acceptance application server 103 generates information indicating error end of printing end processing in the printing instruction acceptance application server 103. The processing status response unit 7028 transmits the information to the web service requester unit 1702 of the printing instruction confirmation application 7033. The information indicating error end of printing end processing in the printing instruction acceptance application server 103 takes the form of a character string to be displayed in the status display area 811 of the operation unit 1042 of the printing apparatus 104.

In step S1618, the web service requester unit 1702 of the printing instruction confirmation application 7033 receives print processing end information from the processing status response unit 7028 of the printing instruction acceptance application server 103. The printing instruction confirmation application 7033 displays the received print processing end information in the status display area 811 of the operation unit 1042 of the printing apparatus 104.

According to the embodiment, the web browser 7032 installed in the printing apparatus 104 assigns, to the printing instruction confirmation application 7033 serving as a different software process, confirmation of the completion of conversion processing from document data into print data, which is requested of the printing instruction acceptance application server 103. More specifically, confirmation of a response to a processing request transmitted from the web browser 7032 and subsequent processing are assigned to a software process different from the web browser. Immediately when the web browser issues a printing instruction, it is released from processing regarding the printing instruction. Hence, processing requests can be parallelly transmitted to a plurality of different web application servers regardless of whether the web browser has already transmitted a processing request to any web application server. Also, immediately when a printing instruction is issued, the resource of the printing apparatus 104 can be assigned to copying, facsimile, or the like without occupying it by printing of a document on the network. If the printing instruction confirmation application 7033 is copied and the copies are parallelly executed, the completion of data conversion processes and printing processes regarding a plurality of printing instructions can be parallelly monitored. By Comet communication, the printing instruction confirmation application can acquire print data at the timing when data conversion processing shown in FIG. 15 ends. Print data can be acquired from the server in real time.

In step S1608 of FIG. 16A, the completion of data conversion processing or a blank HTTP response is transmitted, but another information may be set in an HTTP response and transmitted. For this purpose, it is tested in, for example, step S1604 not only whether conversion processing is completed but also whether a message has been transmitted from the printing instruction acceptance application server 103. If a message has been transmitted, it is set in an HTTP response and transmitted in step S1608. Upon receiving the HTTP response, the printing instruction confirmation application 7033 performs processing complying with the contents of the response.

Further, the printing instruction confirmation application 7033 can be installed in a network interface card.

The present invention has described the printing apparatus as a client. However, the present invention is also applicable to a terminal for using a web service via a web browser, such as a so-called thin client or network.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-101440, filed Apr. 26, 2010, which is hereby incorporated by reference herein in its entirety.

What is claimed is:

1. A client terminal communicating with a document management server and a print server, wherein the document management server stores document data and the print server obtains the document data and converts it into print data, the client terminal comprising:
a web browser unit configured to interpret HTML (HyperText Markup Language) data to display information, wherein the web browser unit displays a list of documents stored in the document management server and transmits a conversion request to the print server for a document that is selected from among the documents in the list; and
a print confirmation unit configured to confirm a progress of print conversion processing for the selected document to the print server in place of the web browser unit, and transmit a service request repeatedly until a response containing print data, which is converted based on the document, is replied from the print server, wherein the print confirmation unit is independent of the web browser,
wherein the web browser unit is further configured to instruct the print confirmation unit to initiate processing of confirming a progress of the print conversion processing for the selected document to the print server after the transmission of the conversion request, and
wherein the print confirmation unit transmits the service request repeatedly while the printing confirmation unit receives a response from the print server transmitted if the print conversion processing is not completed when a response setting time set at a reception of the previous service request in the print server has expired, and stops transmitting the service request in response to a response from the print server transmitted when the print conversion processing is completed, which contains the print data converted from the document.

2. The client terminal according to claim 1, wherein a startup script for initiating the print confirmation unit is contained in a request acceptance screen received as a response to the conversion request, and the web browser unit executes the startup script to instruct the print confirmation unit to initiate processing of confirming a progress of the print conversion processing for the selected document to the print server according to the startup script.

3. The client terminal according to claim 2, wherein the request acceptance screen that is received and displayed by the web browser unit further contains a document indicating that the web browser can be terminated.

4. A managing method executed by a client terminal communicating with a document management server and a print server, wherein the document management server stores document data and the print server obtains the document data and converts it into print data, the method comprising:
in a web browser unit, interpreting HTML (HyperText Markup Language) data to display information, wherein the web browser unit displays a list of documents stored in the document management server and transmitting a conversion request to the print server for a document which is selected from among the documents in the list; and
in a print confirmation unit, confirming a progress of print conversion processing for the selected document to the print server in place of the web browser unit, and transmitting a service request repeatedly until a response containing print data which is converted based on the selected document is replied from the print server, wherein the print confirmation unit is independent of the web browser unit,
wherein in the web browser unit, the print confirmation unit is further instructed to initiate processing of confirming a progress of the print conversion processing for the selected document to the print server after the transmission of the conversion request, and
wherein the print confirmation unit transmits the service request repeatedly while a response from the print server transmitted if the print conversion processing is not completed when a response setting time set at a reception of the previous service request in the print server has expired, and stops transmitting the service request in response to a response from the print server transmitted when the print conversion processing is completed, which contains the print data converted from the document.

5. The method according to claim 4, wherein a startup script for initiating the print confirmation unit is contained in a request acceptance screen received as a response to the conversion request, and in the web browser unit, the startup script is executed to instruct the print confirmation unit to initiate processing of confirming a progress of the print conversion processing for the selected document to the print server according to the startup script.

6. The method according to claim 5, wherein the request acceptance screen that is received and displayed by the web browser unit further contains a document indicating that the web browser can be terminated.

* * * * *